(12) United States Patent
Klappe et al.

(10) Patent No.: US 11,788,318 B2
(45) Date of Patent: Oct. 17, 2023

(54) INFLATABLE TENT

(71) Applicant: STUDIO NINABER B.V., Delft (NL)

(72) Inventors: Joshua Klappe, Delft (NL); Bruno Ninaber Van Eyben, Delft (NL)

(73) Assignee: STUDIO NINABER B.V., Delft (NL)

( * ) Notice: Subject to any disclaimer, the term of this patent is extended or adjusted under 35 U.S.C. 154(b) by 0 days.

(21) Appl. No.: 16/491,590

(22) PCT Filed: Mar. 9, 2018

(86) PCT No.: PCT/EP2018/055914
§ 371 (c)(1),
(2) Date: Sep. 6, 2019

(87) PCT Pub. No.: WO2018/162715
PCT Pub. Date: Sep. 13, 2018

(65) Prior Publication Data
US 2020/0332551 A1    Oct. 22, 2020

(30) Foreign Application Priority Data
Mar. 9, 2017 (NL) .................................. 2018492

(51) Int. Cl.
*E04H 15/20* (2006.01)
(52) U.S. Cl.
CPC ....... *E04H 15/20* (2013.01); *E04H 2015/201* (2013.01); *E04H 2015/204* (2013.01); *E04H 2015/208* (2013.01)
(58) Field of Classification Search
CPC .............. E04H 15/20; E04H 2015/201; E04H 2015/204; E04H 2015/208; E04H 15/38; A01G 13/0231

USPC .......................................................... 52/2.23
See application file for complete search history.

(56) References Cited

U.S. PATENT DOCUMENTS

| | | | | | |
|---|---|---|---|---|---|
| 2,411,316 | A | * | 11/1946 | Capita ..................... | E04H 15/20 52/2.19 |
| 2,656,844 | A | * | 10/1953 | Kreuzer .................. | E04H 15/20 52/2.19 |
| 2,782,794 | A | * | 2/1957 | White ..................... | E04H 15/20 52/2.19 |
| 2,830,606 | A | * | 4/1958 | Daugherty .............. | E04H 15/20 52/2.19 |
| 4,335,545 | A | * | 6/1982 | Couch ..................... | E04H 15/20 52/2.19 |
| RE31,465 | E | * | 12/1983 | Robichaud .............. | E04H 15/06 135/133 |
| 4,607,655 | A | * | 8/1986 | Wagner ................... | E04H 15/20 135/116 |

(Continued)

FOREIGN PATENT DOCUMENTS

| | | |
|---|---|---|
| DE | 102011104502 A1 | 12/2012 |
| DE | 202014007021 U1 * 2/2015 | ............. E04H 15/06 |

(Continued)

*Primary Examiner* — Jessica L Laux
(74) *Attorney, Agent, or Firm* — HOYNG ROKH MONEGIER B.V.; David P. Owen

(57) ABSTRACT

The document concerns inflatable tents, in particular non-durable, inflatable tents. The tents are provided with an inflated arch and a flysheet. The arch can be simply constructed from first and second flexible sheet materials joined to one another, and the flysheet is pivotally openable about the arch.

16 Claims, 12 Drawing Sheets

(56) References Cited

U.S. PATENT DOCUMENTS

| | | | | |
|---|---|---|---|---|
| 5,007,212 A | * | 4/1991 | Fritts | E04H 15/20 |
| | | | | 52/2.18 |
| 5,097,548 A | * | 3/1992 | Heck | E04H 15/20 |
| | | | | 5/482 |
| 6,192,633 B1 | * | 2/2001 | Hilbert | E04H 1/1277 |
| | | | | 52/2.18 |

FOREIGN PATENT DOCUMENTS

| | | | | |
|---|---|---|---|---|
| FR | 1551869 A | | 1/1969 | |
| FR | 1605077 A | | 1/1973 | |
| GB | 2368599 A | | 5/2002 | |
| JP | 2013249731 A | * | 12/2013 | |
| NL | 1002230 C2 | | 8/1997 | |
| WO | WO8903468 | | 4/1989 | |
| WO | WO-9417266 A1 | * | 8/1994 | A47C 27/081 |

\* cited by examiner

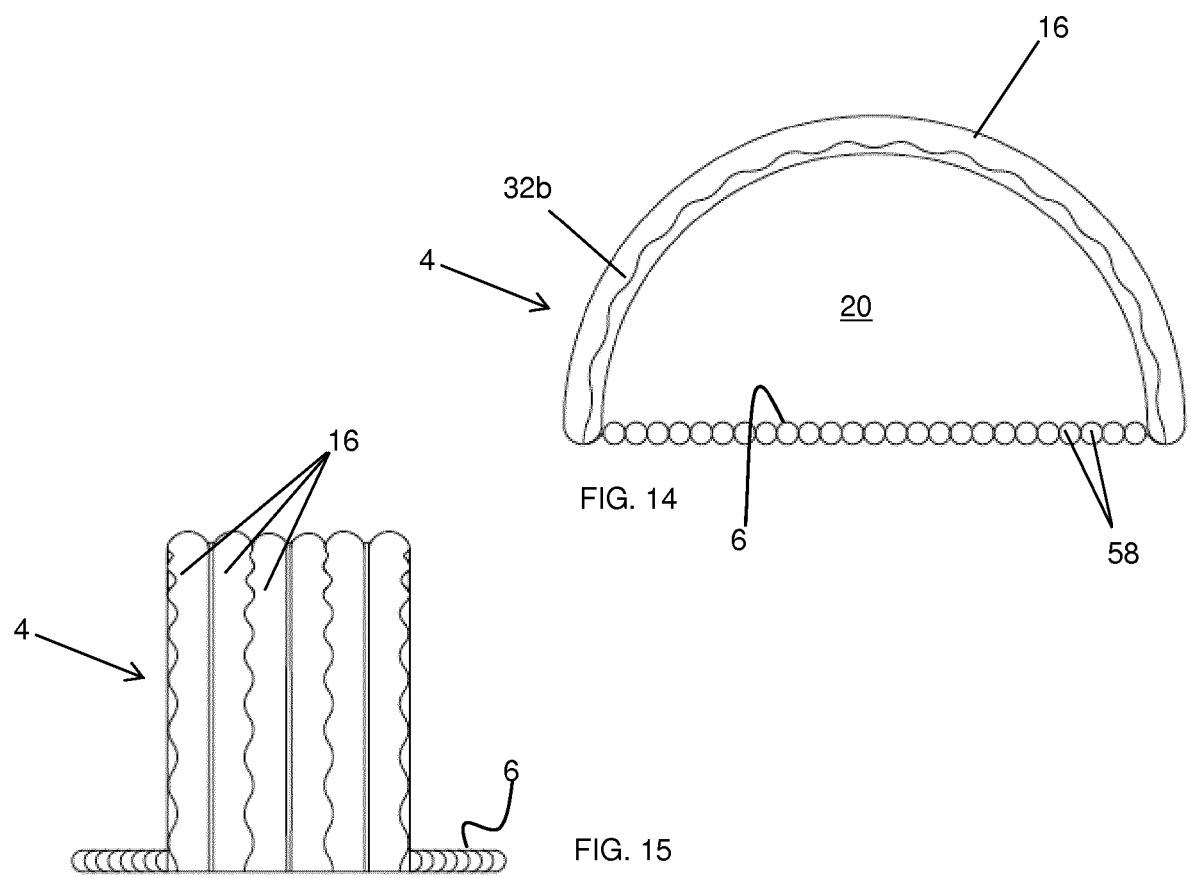
FIG. 14
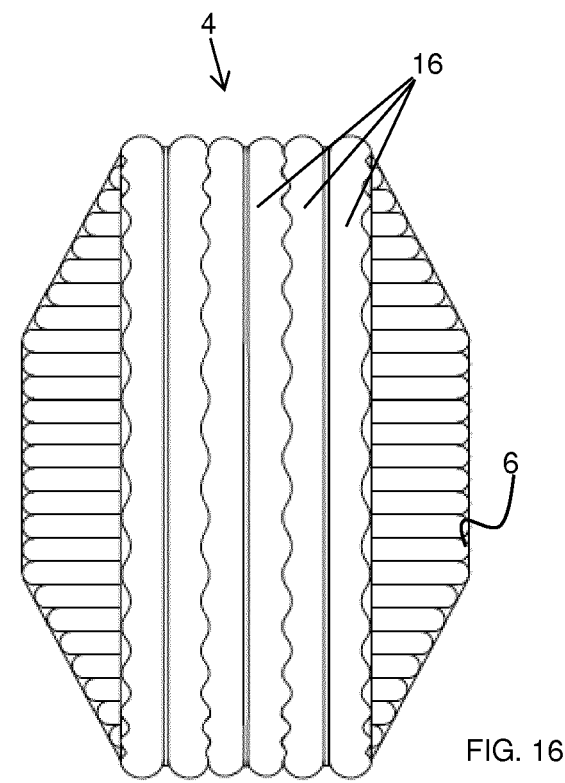
FIG. 15
FIG. 16

INFLATABLE TENT

BACKGROUND OF THE INVENTION

1. Field of the Invention

The present invention relates in general to tents, in particular non-durable, preferably disposable, tents, particularly single-use, tents. The tents are preferably inflatable tents.

Further aspects of the invention can concern components comprised in the tent, a method of making the tent, and methods of making components of the tent; a kit of parts comprising components comprised in the tent; the tent in a pre-pitched form; a package comprising the pre-pitched tent; a method of pitching the tent; a method of using the tent; and a method of disposing of, preferably recycling, the tent.

Alternatively, the invention may relate to an inflatable greenhouse, such as an inflatable hothouse or inflatable conservatory.

2. Description of the Related Art

Tents of various sizes and shapes are well known, and are used in a variety of situations when a temporary shelter or abode is desired. Uses may include recreational camping, such as during vacations or at outdoor festivals; and/or provision of emergency shelter, in the event of displacement of persons from their normal residence.

Common tents are typically made up of fabric sheets pulled taught over a frame constructed of supporting poles, for example poles of metal(-alloy), polymer resin or wood. Such traditional tents can be time consuming and complex to pitch and strike; heavy and inconvenient to transport, either as user or seller; and expensive and difficult to produce and dispose of, making them unsuitable for short-term use or single use applications.

For example, it is known that relatively inexpensive forms of conventional tents are often used singularly, e.g. at festivals. However, these conventional inexpensive tents have not been explicitly designed for single-use purposes, and are simply low-quality versions of traditional tents. These low quality tents can readily break and become unusable, they are also of relatively low cost, and so users tend to discard them on festival campgrounds. These discarded tents can form a major waste problem because although cheap and of low quality, they contain durable materials such as aluminum, cotton and synthetic polymer fabrics. In addition, although they are inexpensive and a low quality version of conventional tents, the complexity of such conventional constructions, as well as the production methods for the materials, can still result in laborious and overly expensive tent manufacture, and a higher than desired environmental impact.

A simple exchange of the conventional tent materials with more environmentally friendly materials, e.g. bio-based materials, whilst maintaining conventional tent production methods, does not fully address the above problems.

As an alternative to traditional tents, inflatable tents have been proposed. Inflatable tents are discussed, for example, in patent literature publications U.S. Pat. Nos. 6,929,016, 3,840,919, 4,109,681, 4,197,681, 4,271,642, US2003116182, U.S. Pat. Nos. 4,335,545, and 5,893,238.

US2003116182, for example, discusses a tent made up of a plurality of inflatable hollow rounded tent units that are joined together to construct an elongate tent body. The constructions remain relatively complex, relying upon provision and secure construction of a number of modules into an eventual large tent structure. In addition, the arched and hemispherical modules are complex, being constructed from sheets including upper sheets and lower sheets with intermediate side panels. The provision of side panels joined by seams to upper and lower sheets can lead to laborious manufacturing and/or points of weakness within the structure. The variety of materials used in such a construction can also be extensive, which can make disposal, e.g. by recycling, complex.

U.S. Pat. No. 4,335,545 discusses an inflatable tent with air-inflated chambers that form the body of the tent. The disclosure focusses on provision of one way valves in each air chamber to prevent collapse of the structure if one chamber is punctured. The major structure of the tent is composed of a series of adjacent air chambers separated by solid sheets of material. To remain erect the tent comprises a variety of differently oriented air chambers. Such a tent may be complex to manufacture and contains a variety of materials, which can complicate disposal.

U.S. Pat. No. 5,893,238 discusses an inflatable tent construction with upper and lower wall units, each of which comprise a plurality of vertically aligned inflatable tubular chambers having horizontally arrayed inflatable rings disposed on both their tops and bottoms. The construction is complex and does not lend itself to being easily made or recycled.

There remains a need for an improved inflatable tent, which is preferably one or more of: easy to pitch; easy to strike; easy to dispose of, e.g. by recycling or destruction; lightweight; secure; compact in a pre-pitched state; comfortable for a user; low cost in material content and manufacturability; readily manufactured on a large scale; and of low environmental impact compared to at least some prior art tents.

In the alternative, the invention may concern an inflatable greenhouse, such as an inflatable hothouse or inflatable conservatory. A greenhouse is a suitably transparent structure delimiting a volume in which plants are reared, hastened in their growth, and/or protected from the ambient environment. In particular the interior of a greenhouse exposed to sunlight becomes warmer than the external ambient temperature, thus sheltering plants from cold ambient condition.

THE INVENTION

In general the invention concerns a tent comprising an inflated arch and a flysheet. The inflated arch forms a structural body of the tent. The arch and flysheet delimit a human-habitable volume.

In a first aspect of the invention there is provided a tent comprising:
 a flysheet; and
 an inflated arch delimiting a volume;
wherein, the arch comprises a first flexible sheet and a second flexible sheet opposed to said first flexible sheet; and the first flexible sheet and second flexible sheet are joined to each other to form one or more inflated structural support chambers.

The arch forms a structural component of the tent defining a habitable three-dimensional volume for a user. Making a major structural component of the tent from flexible sheet material having inflated, structural support chambers, allows the use of minimal materials and highly efficient manufacturing. That is, the conversion of flexible materials (from sheet form to finished goods) is energy efficient and low in complexity, as compared to the formation of more rigid, semi-rigid or rigid materials, such as aluminium(-alloy) or fibre-in-resin tent poles. In addition, the disposal by recycling or destruction of flexible sheet materials can be less complex and more effective and efficient than recycling or disposal of the more rigid materials.

Although the structural body (the arch) of the tent is made from flexible sheets, it is imparted with structural integrity to form a habitable three-dimensional volume for a user by inflation of the closed structural support chambers formed by the joined first and second flexible sheets. The arch can thus be inflated to a rigid, pitched or erect state that delimits a habitable volume thereunder, so forming a useful tent.

In an alternative aspect of the invention, there is provided a tent comprising:
an arch delimiting a volume; and
a flysheet;
wherein, the flysheet is secured for pivotable opening and/or closing about an axis
substantially perpendicular to the arch.

When pitched, the flysheet can be pivoted open and closed over the arch, about the anchor points. The flysheet in this manner is both a physical barrier to close off at least part of the habitable volume, in particular at the side openings of the arch, and an openable/closeable entrance way to the habitable volume. The combination of an arch structure for the structural body of the tent, and a pitched flysheet secured for pivotable opening and/or closing about a lateral axis, allows the tent to have a functional opening/closure, flap, or door, absent additionally added closure means such as zippers, clasp lockers or other hard plastic, thermoset plastic, or metal components, such as may be normally required in tents.

Preferably the arch of this alternative aspect of the invention, though not limitatively, is an inflated arch, and more preferably is the arch as described in the first aspect of the invention.

Arch

In the present document, the term "arch" refers to a curved structure that spans a space and forms a roof over that space. An arch extends upwardly in a curve between first and second lower ends or feet. The arch of the present invention is preferably a rounded arch, more preferably a substantially a semi-circular arch. Useful arch types can include pointed, parabolic, extended, stretched and elliptical arches. The following discussion of the arch geometry refers to the arch when inflated.

An arch has a height (also known as a rise) that is the perpendicular distance from the arch's highest internal point to the plane of the base of the arch. The base of an arch is where the arch rests its lower ends upon a supporting surface, such as the ground, a tent groundsheet, a tent mattress, or other supporting entity. The height of the arch is preferably from about 50 cm to about 250 cm, more preferably from about 65 cm to about 200 cm, still more preferably from about 70 cm to about 170 cm, and most preferably from about 85 cm to about 140 cm.

An arch may have a radius of curvature. The radius of curvature of the arch is preferably from about 50 cm to about 250 cm, more preferably from about 65 cm to about 200 cm, still more preferably from about 70 cm to about 170 cm, and most preferably from about 85 cm to about 140 cm.

An arch has a length, which is the shortest distance between the internal surfaces of the opposed lower ends, or feet, of the arch. The length of the arch is preferably from about 100 cm to about 500 cm, more preferably from about 130 cm to about 400 cm, still more preferably from about 140 cm to about 340 cm, and most preferably from about 170 cm to about 280 cm.

An arch has a width, which is the lateral distance at right angles to the length. In the case that the width of the arch varies along its length, the arch width refers to the average width. An arch has a mid-point width, which is the width taken at the mid-point of the length. An arch has first and second end-widths, which are the widths taken at the lower ends, and which may be the same or different, preferably the same. The width, midpoint width and/or end widths are preferably from about 30 cm to about 200 cm, more preferably from about 50 cm to about 180 cm, still more preferably from about 70 cm to about 140 cm, and most preferably from about 90 cm to about 120 cm.

An arch has a circumference, which is the distance extending along the inner curve of the arch between the lower ends. The circumference is preferably from about 160 cm to about 800 cm, more preferably from about 220 cm to about 600 cm, still more preferably about 280 cm to about 500 cm, and most preferably from about 320 cm to about 400 cm.

An arch encompasses a habitable volume. The habitable volume refers to a three-dimensional space of a size suitable to receive one or more persons, for example babies, children or adults, preferably adults. The space is defined by the internal surface of the arch's curve, the base plane and the vertical line between edges of the arch and the base plane. The habitable volume defined by the arch is preferably from about 250 liters to about 25,000 liters, more preferably from about 750 liters to about 15,000 liters, more preferably from about 1,500 liters to about 8,000 liters, still more preferably from 2,000 liters to about 5,000 liters.

Preferably the arch is sized to provide a one-person tent or a two-person tent. For a one-person the width, midpoint width and/or end widths are preferably from about 50 cm to about 100 cm, more preferably from about 60 cm to about 90 cm.

For a two-person tent the width of the arch is preferably from about 100 cm to about 200 cm, preferably from about 120 cm to about 180 cm, more preferably from 140 cm to 160 cm.

In one aspect of, the invention there is provided an inflatable arch comprising: a first flexible sheet and a second flexible sheet opposed to said first flexible sheet; wherein the first flexible sheet and second flexible sheet are joined to each other to form one or more inflatable, structural support chambers.

The inflatable arch may be provided to a user in an uninflated state, for example as a folded discreet package. The user then pitches the arch by simply inflating with an inflating material, such as a gas (e.g. air or $N_2$).

Inflatable Structural Support Chambers

The arch is provided with structural support chambers. The structural support chambers are formed by joining together the first flexible sheet and second flexible sheet, at a periphery about a then closed chambers. The term "closed chamber" refers to a physical barrier surrounding an inflatable volume, for example, such as an inflatable cell, wherein an inflating material can be kept within the volume to internally pressurize the physical barrier, that is, to inflate the chamber. The structural support chambers are in this manner inflatable cells. Preferably the structural support chambers comprise an inflatable volume encompassed by the first flexible sheet, the second flexible sheet, one or more peripheral joins of the first and second flexible sheets, and optionally one or more valves.

The term "closed" encompasses the inclusion of a one-way or two-way valve that is configured to hinder, restrict or substantially prevent loss of inflation material during the use of the tent, such that a closed chamber remains inflated during use to provide structural support in the arch. A valve may be an additionally added element, or it may be integrally formed by a join between the first and second flexible sheets. The closed chambers can be inflated to form inflated structural support members, via a valve or similar.

The structural support chambers may be disposed end to end, in series, wherein, in various embodiments, part, parts, or about all, or approximately all, or substantially all, or nearly all, or all of some or all of the structural support chambers can be partly or fully in contact with each other, partly or fully directly connected to each other, and/or partly or fully joined to each other along end-join lines. The structural support chambers may also or alternatively be disposed side by side, in parallel, wherein, in various embodiments, part, parts, or about all, or approximately all, or substantially all, or nearly all, or all of some or all of the structural support chambers can be partly or fully in contact with each other, partly or fully directly connected to each other, and/or partly or fully joined to each other along side-joins.

Adjacent structural support chambers may be sealed from one another to substantially prevent flow of an inflating material between them.

Adjacent structural support chambers may be in restricted fluid-communication for passage of inflating material therebetween. In this respect, preferably, one or more one-way and/or two-way valves may be provided between adjacent structural support chambers.

Use of sealing or valves between adjacent inflatable structural support chambers can help to prevent loss of structural integrity of the arch in the event of unintended puncture of one or more of the individual structural support chambers. In embodiments with restricted fluid-communication therebetween e.g. via one or more one-way and/or two-way valves, a grouping of structural support chambers can be closed about a shared periphery to maintain inflation within the group. The grouping of structural support chambers may comprise an elongate series of structural support chambers extending in the curve of the arch and/or laterally adjacent structural support chambers. The grouping of structural support chambers may comprise substantially all of the structural support chambers of the arch.

In other embodiments, adjacent structural support chambers may be in free fluid-communication with one another via open passages between them, for example if a join line between the first and second flexible materials does not extend about the full periphery of a structural support chamber, so leaving an open passage to an adjacent chamber. In such embodiments, a grouping of structural support chambers is closed about a shared periphery to maintain inflation within the group. The grouping of structural support chambers may include an elongate series of structural support chambers extending in the curve of the arch and/or laterally adjacent structural support chambers. The grouping of structural support chambers may include substantially all of the structural support chambers of the arch.

In the uninflated state (for example, pre-inflated or deflated) the structural support chambers are unfilled or unexpanded, so that the first and second flexible sheets are not held in tension by an internal pressure. The structural support chambers, and hence also the arch, are in this state flexible, and occupy minimal space. This allows for simple packaging and transportation of the arch in an uninflated state.

To pitch the arch, the structural support chambers can be inflated with an inflating material. Substantially filling the structural support chambers with an inflating material creates tension in the first and second flexible sheets of the closed chamber, imparting rigidity thereto. The emergent rigidity in the inflated chambers forms a support structure for the arch once it is pitched.

Inflating materials include fluids e.g. liquids and gases, and most preferably comprise gas (e.g. air, $N_2$, inert gases, or mixtures thereof). The structural support chambers are preferably gas-inflated. The gas inflation creates an internal pressure in the closed chambers. Alternative inflation materials that may be used include foams, gels, or liquids, however, for cost and weight purposes, these alternatives are less preferred.

The structural support chamber internal pressure when inflated is greater than ambient pressure. Preferably the internal pressure is greater than atmospheric pressure, preferably greater than 1 bar. The pressure may preferably be 2 bar or less than 2 bar, more preferably 1.5 bar or less.

The structural support chambers are preferably elongate and extend in the curved circumference of the arch.

The structural support chambers preferably comprise opposed end-joins between the first and second flexible sheets defining the longitudinal outer ends of the chambers. The closed chambers preferably comprise opposed side-joins between the first and second flexible sheets, extending between the end-joins to enclose the inflatable volume.

In some embodiments, one or more structural support chambers may be provided in series, the series of structural support chambers extend in the curved circumference of the arch. The individual structural support chambers in series are preferably separated from one another by end-wall joins.

Preferably the arch is provided with structural support chambers over its full circumference, that is, one or more structural support chambers are provided from a first lower end of the arch to a second lower end of the arch in a continuous line.

As will be discussed in more detail below, in preferred embodiments some or all of the individual structural support chambers may extend over substantially the full circumference of the arch.

In other embodiments, one or more structural support chambers may be provided in series, and the series of structural support chambers can extend over the full circumference of the arch. The series of structural support chambers are preferably contiguous in the line of curvature of the circumference of the arch. Preferably in series adjacent closed chambers are separated by a shared end-join between the first and second flexible sheets.

In some embodiments there may be provided a combination of individual structural support chambers that extend over substantially the full circumference of the arch, and one or more structural support chambers in series, with the series of structural support chambers extending over substantially the full circumference of the arch.

Preferred embodiments of the arch comprise a plurality of structural support chambers across its width. The structural support chambers are preferably elongate in the line of the arch's curve and the elongate axes of the closed chambers are disposed side-by-side, and preferably generally or substantially parallel longitudinal axes. In preferred embodiments, the plurality of structural support chambers are adjacent in the width of the arch, preferably immediately adjacent. Most preferably structural support chambers adjacent in the arch width share one or more side-join lines.

In preferred embodiments the arch comprises from 2 to 15 structural support chambers across its width, more preferably from 3 to 12, more preferably from 4 to 10, and most preferably from 5 to 8 structural support chambers across its width. In preferred embodiments at least 60% of the width of the arch comprises structural support chambers, more preferably at least 75% of the width, still more preferably at least 90% of the width, and most preferably substantially the full width of the arch comprises structural support chambers.

It is preferable that the structural support chambers are configured to provide both structural support when inflated, and to allow a relatively smooth curvature to the arch, that is, without substantial kinks, peaks or other deviations from the curve of the arch.

In some embodiments one or more elongate structural support chambers are provided in series with a flexible portion between. The non-inflated, flexible portion may be a non-inflated volume between the first and second flexible sheets, but is preferably a shared end-join between the in series structural support chambers. The flexible portion may act as a lateral line of flexure, such as a (living)hinge, between the (semi-)rigid inflated structural support chambers. Inclusion of one or more lines of flexure can allow a series of inflated structural support chambers to be brought into an arch form while avoiding substantial kinks, peaks or other deviations from the desired curve. It is preferable that a series of closed chambers comprises from 2 to 15 lines of flexure, preferably from 4 to 12 lines of flexure, and most preferably from 5 to 9 lines of flexure.

In embodiments where the arch comprises a plurality of series of structural support chambers across its width, at least some of the lines of flexure in the adjacent series of structural support chambers are off-set from one another. That is, at least some of the lines of flexure are not adjacent one another across the width of the arch. Preferably the lines of flexure in immediately adjacent series of structural support chambers are off-set.

Off-setting the lines of flexure in adjacent series of structural support chambers can provide an appropriate balance between flexibility to achieve the curve of an arch and suitable structural rigidity to define a secure habitable volume. This accomplishment is of particular advantage because it can be achieved with a simple construction based upon two joined flexible sheets, as opposed to more complex constructions requiring additional side walls.

In some embodiments the structural support chambers may be provided with a natural tendency to form into a curve when inflated. In this respect, the structural support chambers may be elongate, extending in the curve of the arch, and comprise opposed side-joins between the first and second sheets, wherein the lengths of the opposed side joins are unequal. That is, the length of one side join is greater than the length of an opposed side join. Preferably the opposed side-joins end at the same distance along the circumference of the arch. Once inflated, the structural support chamber will tend to take on an arched configuration as its lowest energy configuration.

In a preferred embodiment, a first side-join of a structural support chamber is substantially straight along the line of the circumference of the arch, and a second side-join of the structural support chamber opposed to the first side-join, is non-straight or non-linear along the circumference of the arch. The second side-join is thus greater in length. Preferably the non-straight side-join is meandering, and more preferably has a wave-form extending in the circumference of the arch.

In such embodiments some or all of the individual structural support chambers may extend over substantially the full circumference of the arch. For example the closed volume of such a chamber extends continuously from a first end of the arch to a second end of the arch. The unequal side-joins provide a natural curve to the structural support chambers such that an arch can be achieved without inclusion of lateral flexural lines formed by non-inflated portions between closed chambers that are in series. This can be advantageous because it can reduce the total number of individual structural support chambers in an arch, simplifying manufacturing, inflation and deflation. It may also provide a smoother curve to the arch.

There is thus achieved an inflatable arch without substantial kinks, peaks or other deviations from its curve, but while also providing structural rigidity to define a secure habitable volume. This accomplishment is of particular advantage because it can be achieved with a simple construction based upon two joined flexible sheets, as opposed to more complex constructions requiring additional side walls.

In some embodiments, the laterally adjacent structural support chambers are complementary in shape along an elongate boundary between them. For example, the meander or wave form of a first structural support chamber may be complementary with a meander or wave form of a directly, laterally adjacent structural support chamber. The line of the adjacent sides may in this way nest, mesh, and/or conform to one another.

In any of the embodiments discussed, the structural chambers may be generally cylindrical, having a lateral cross-section that is generally elliptical, oval or substantially circular, when inflated. Such a lateral cross-section can result from the construction of the structural support chambers from directly joined first and second flexible sheets. This is distinct from closed chambers that may be formed of three, four or more panels e.g. having upper and lower panels indirectly attached by intermediate side-walls, which take on generally multisided cross-sections, having corners e.g. square, when inflated.

In some embodiments the closed chambers may be sealed once inflated, such that deflation is only possible by destructive measures. Sealing may be achieved by use of a one-way valve allowing inflation but not deflation.

It is preferred that a mid section between the opposed bases of the arch is absent inflated cells that are elongate in the width of the arch. More preferably the whole arch is absent inflated cells that are elongate in the width of the arch.

First and Second Flexible Sheets

The opposed first and second flexible sheets may be physically separate sheets of material that are joined together. Alternatively, the opposed first and second flexible sheets may be formed from a single flexible sheet folded upon itself to form opposed first and second flexible sheets. The first and second flexible sheets may also be comprised of strips, patches or other units of sheet material, joined together in a plane to form the first and/or second flexible sheets.

In the present application the terms "joined" and "join" in reference to the connection of the first and second sheets refers to the sheets being joined directly to one another. This refers to a configuration wherein the first and second sheets are attached to each other without intermediate elements between, except for optional means of attachment, e.g. adhesive or a heat weld. For example, joining of the first and second sheets is done without any dimensionally substantial components, such as intermediate sidewalls. The flexible sheets are directly joined to one another rather than indirectly connected.

Joining of the flexible sheets to one another can be done using any kind of joining technique, preferable examples include sealing (e.g. heat sealing, conductive sealing, impulse sealing, ultrasonic sealing, etc.), welding, crimping, bonding, adhering, and combinations of any of these. Heat sealing is preferred.

As used herein, the term "indirectly connected" refers to a configuration wherein elements are attached to each other with one or more intermediate elements therebetween.

The first and second flexible sheets comprise flexible material. The flexible sheets are easily deformable, sheet-like material, having a flexibility factor within the range of 1,000-2,500,000 N/m, preferably from 1,000 to 1,500,000 N/m, more preferably from 1,500 to 1,000,000 N/m, still more preferably from 2,500 to 800,000 N/m, still more preferably from 5,000 to 700,000 N/m, still more preferably from 10,000 to 600,000 N/m, still more preferably from 15,000 to 500,000 N/m, still more preferably from 20,000 to 400,000 N/m, still more preferably from 25,000 to 300,000 N/m, still more preferably from 30,000 to 200,000 N/m, still more preferably from 35,000 to 100,000 N/m, still more preferably from 40,000 to 90,000 N/m, most preferably from 45,000 to 85,000 N/m.

The flexibility factor refers to a material parameter for a thin, easily deformable, sheet-like material, wherein the parameter is measured in Newtons per meter, and the flexibility factor is equal to the product of the value for the Young's modulus of the material (measured in Pascals) and the value for the thickness of the material (measured in meters).

The flexible sheets may comprise one or more of any of the following materials: films (such as plastic films), elastomers, foamed sheets, foils, fabrics (including wovens and nonwovens), biosourced materials, and papers, in any configuration, as separate material(s), or as layer(s) of a laminate, or as part(s) of a composite material. In various embodiments, part, parts, or all of a flexible material can be coated or uncoated, treated or untreated, processed or unprocessed, to give desired characteristics such as gas impermeability, water resistance/proofing etc. In various embodiments, parts, parts, or all of a flexible material can made of sustainable, bio-sourced, recycled, recyclable, and/or biodegradable material.

The flexible sheets may be made from a variety of materials that can confine materials used to inflate the inflated structural chambers of the arch, for example gases, in particular air or $N_2$.

Exemplary materials include, without limitation, polyethylene (homopolymers, such as low density polyethylene (LDPE) and high density polyethylene (HDPE); and copolymers, such as ionomers, EVA, EMA, ethylene/alpha-olefin copolymers), polypropylene (homopolymers and copolymers, such as propylene/ethylene copolymer), polylactic acid, polyethylene terephthalate, polyethylene furanoate, polyester, nylon, polyvinyl chloride, polystyrenes, polyamides, polycarbonates, and the like.

The sheets may be made by any known extrusion process by melting the component polymer(s) and extruding, coextruding, or extrusion-coating them through one or more flat or annular dies.

Polymer sheets that are susceptible to heat sealing techniques are preferred for ease of manufacturing and construction. For example, continuous webs of first and second sheets can be heat sealed to one another in various patterns to form the closed chambers discussed above. Polyethylene is susceptible to heat sealing and is a preferred material for the first and second sheets.

Further exemplary materials may be sustainable, biosourced, recycled, recyclable, and/or biodegradable materials. For example, low density polyethylene (LDPE), which can be recycled into LDPE resin pellets, and then used to form new products, saving energy and mineral oil resources.

As used herein, the prefix "bio-" is used to designate a material that has been derived from a renewable resource. Nonlimiting examples of renewable resources include plants (e.g., sugar cane, beets, corn, potatoes, citrus fruit, woody plants, lignocellulosics, hemicellulosics, and cellulosic waste), animals, fish, bacteria, fungi, and forestry products. Natural resources such as crude oil, coal, natural gas, and peat are not renewable resources.

Nonlimiting examples of renewable polymers include polymers directly produced from organisms, such as polyhydroxyalkanoates and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The flexible sheets of the tent may comprise mixtures of different polymers, including mixtures of polymers from both renewable and non-renewable resources.

The first flexible sheet and/or second flexible sheet preferably have a basis weight of from 10 to 1000 gsm, preferably from 15 to 800 gsm, more preferably 20 to 600 gsm, still more preferably 25 to 400 gsm, and most preferably or 30 to 200. The term "basis weight" refers to a measure of mass per area, in units of grams per square meter (gsm).

The flexible sheets may have a thickness such that they are compliant and readily deformable for packing, handling, tent pitching, tent striking, transportation, and disposal. In some embodiments the thickness of the first flexible sheet and second flexible sheet may be approximately the same. In other embodiments, the thickness of the first flexible sheet may be greater than or less than the thickness of the second flexible sheet.

The flexible sheets preferably have a thickness of from 5 to 1000 micrometers, more preferably from 5 to 500 micrometers, more preferably from 10 to 500 micrometers, more preferably from 20 to 400 micrometers, more preferably from 30 to 300 micrometers, more preferably from 40 to 200 micrometers, and most preferably from 50 to 100 micrometers.

The flexible sheets may be coated or layered with other materials. The flexible sheets may be laminate constructions of a plurality of layers of similar or dissimilar films, such that the flexible sheets are a composite construction. Examples of coatings include, without limitation, polymer coatings, metalized coatings, and/or ceramic coatings. Coating materials and/or laminate constructions may reduce permeability of the inflation material stored in the inflated chambers, increase thermal insulation, reduce susceptibility to condensation build up etc. Alternatively, the coating materials may provide decorative or informative purposes.

In some embodiments, the flexible sheets may be film laminates that include multiple layers of the same or different types of materials to provide desired properties such as strength, flexibility, the ability to be joined, imperviousness to inflating material, e.g. gas, and the ability to accept printing.

One example of a film laminate includes a five-layer low-density polyethylene LDPE/tie/Nylon/tie/LDPE with a total thickness of 100 micrometer.

Method of Arch Production

The arch is made out of flexible sheets, which can allow simple and cost-efficient manufacturing.

For example, the arch can be made from continuous webs of flexible material. The webs of material may be provided from rolls of material, or by blow-extrusion, or by any other source.

This allows the arch to be manufactured in a continuous, fully automated process in which a web of material is altered over a sequence of steps, resulting in large quantities of identical products.

Various apparatus and methods for joining flexible sheets are known in the art of sheet handling. Conventional sheet handling apparatus and methods may be used to form the arch with structural support chambers.

An exemplary process for making an arch discussed above, may comprise: providing juxtaposed flexible sheets, for example from a roll of sheet material, conveying the flexible sheets along a path of travel; and joining the juxtaposed flexible sheets to one another along predetermined join lines with a joining device (preferably a sealing device).

In some embodiments the juxtaposed films may be opposing faces of a film folded upon itself along a side edge. In some embodiments the juxtaposed sheets may be juxtaposed sides of a flattened tube, i.e., with two opposing folded/closed longitudinal edges.

In a preferred embodiment a longitudinal join is formed between the juxtaposed sheets as they are conveyed along a longitudinal path of travel. The longitudinal path may be linear, non-linear, meandering or of wave form. A joining device may laterally shift in relation to the juxtaposed sheets to produce a non-linear, meandering or wave-form join.

The invention is further directed to a method of manufacturing an inflatable arch as discussed herein, the method comprising the steps of:
  providing a first flexible sheet;
  providing a second flexible sheet opposed to said first flexible sheet; and
  joining the first flexible sheet and the second to each other to form one or more inflatable, structural support chambers between the first flexible sheet and second flexible sheet.

Flysheet

A flysheet is provided as a component of the tent of the invention. A flysheet is a flexible sheet of material pulled taught over the habitable volume of a tent. It forms a physical barrier between the habitable volume and the ambient conditions of the environment. Typically a flysheet is pitched over the main body of the tent.

The flysheet described herein can be used with any of the aspects of the invention.

In the pitched state, the flysheet forms a physical barrier over at least part of one or more side-openings of the arch, which arch side-openings can function as user entryways into the habitable volume under the arch. The flysheet in this manner completes a physical barrier between the habitable volume and the ambient conditions of the environment by closing off open sides of the arch.

The flysheet is preferably pitched over the arch, preferably pulled taught over and into contact with the arch.

In a preferred embodiment of the flysheet, the flysheet comprises a flexible sheet material having opposed first and second side-edges, wherein the first side-edge is configured for pivotal anchoring to a tent supporting surface (e.g. the ground, a tent groundsheet, a tent mattress, or other tent supporting entity) on a first side of the arch, and the second side-edge is configured for pivotal anchoring to a tent supporting surface on a second side the arch.

Preferably the first side-edge and second side-edge are configured for pivotal anchoring on opposite sides of the arch, the anchoring positions being substantially laterally opposed to one another and forming a pivoting axis substantially lateral to the arch.

The side-edges can be anchored to any known fastening system for tents, such as tent pegs, stakes or screws.

Preferably the opposed anchor points are within 25% of the lateral midline of the length of the arch, based on the total arch length, more preferably within 15% of the midline of the length of the arch, more preferably within 5% of the midline of the arch, and most preferably substantially at the lateral midline of the arch.

In preferred embodiments the first side-edge and the second side-edge of the flysheet are provided with anchor lines or guys configured to be attached to known tent fastening systems (e.g. pegs etc.) when pitched.

In some embodiments, a plurality of anchoring lines or guys may be distributed along each of the first and second side-edges of the flysheet, preferably equidistantly distributed.

In some embodiments, the anchor lines or guys comprise one or more drawcords. The drawcords may function to gather the first and second side-edges toward their respective anchor points, maintaining tension in the flysheet in both open and closed positions.

The drawcords may be incorporated into the side-edges of the flysheet by insertion into a hem, one or more channels or one or more casings along the first and second side-edges, or may be laced through eyelets on the first and second side-edges, or any combination thereof.

In some embodiments the anchor lines or guys may comprise loops.

In some embodiments the anchor lines or guys are configured to gather or collect together the side-edge of the flysheet. For example, the anchor lines or guys may be provided with a closeable loop at one end to hold a side-edge of the flysheet in gathered form. An opposed end the anchor line or guy is attachable to a tent fastener.

When pitched, the flysheet can be pivoted open and closed over the arch, about the anchor points. The flysheet in this manner is both a physical barrier to close off at least part of the habitable volume, in particular at the side openings of the arch, and an openable/closeable entrance way to the habitable volume. The combination of an arch structure for the structural body of the tent, and a pitched flysheet secured for pivotable opening and/or closing about a lateral axis, allows the tent to have a functional opening/closure, flap, or door, absent additionally added closure means such as zippers, clasp lockers or other hard plastic, thermoset plastic, or metal components, such as may be normally required in tents.

Avoiding inclusion of such additional components can be beneficial in reducing manufacturing steps, and can reduce difficulties in disposal, especially recycling, because of the need to sort such components to distinct recycling/disposal streams.

The pivoting opening and closing configuration allows the flysheet to be of a simple construction. Such a flysheet can be manufactured in a process comprising continuous, preferably fully automated, steps. For example, a process for manufacturing the flysheet can employ production from a continuous web of flexible sheet material.

In some embodiments the flysheet may comprise laterally extending fold-lines, for example, the flysheet may have a concertina form, or be pleated. This may aid in a smooth opening and closing of the flysheet and in maintaining tension in the flysheet in both open and closed positions.

The flysheet may comprise any form that can be pitched with the arch to form a physical barrier over at least part of one or more side-openings of the arch.

In embodiments where the flysheet is pivotally operable for opening and closing, the flysheet comprises a form that can be pitched with the arch to form a physical barrier over at least part of one or more side-openings of the arch, and which can be anchored to pivotal anchoring points on opposite sides of the arch.

In some embodiments, the flysheet is generally rectangular, including square. However, other forms may be envisioned.

The flysheet may have length between first and second ends that is greater than or similar to the circumference of the arch. The length of the flysheet may from about 180 cm to about 570 cm, more preferably from about 250 cm to about 520 cm, still more preferably about 295 cm to about 420 cm, and most preferably from about 320 cm to about 400 cm. The length of the flysheet is preferably from about 1% to about 20% greater than the circumference of the arch, preferably from about 3% to about 15% greater, more preferably from 4% to 8% greater.

The flysheet may have a breadth between first and second side-edges that is greater than the width of the arch. Preferably the breadth of the flysheet is from about 160 cm to about 550 cm, preferably from about 230 cm to about 500 cm, still more preferably about 275 cm to about 400 cm, and most preferably from about 300 cm to about 380 cm.

The flysheet may comprise any of the materials discussed in relation to the first and second flexible sheets of the arch.

In preferred embodiments the flysheet comprises the same polymer type as the arch. This can simplify disposal of the tent by recycling or destruction because the flysheet and arch can be handled in the same disposal stream. Preferably the arch and flysheet are both made of polyethylene, polypropylene, polyethylene terephthalate, polyethylene furanoate, polyester, nylon, or polyvinyl chloride. Preferably the arch and flysheet are both made of polyethylene.

The basis weight and/or thickness of the flysheet may be less than that discussed for the arch flexible sheets.

Mattress

In some embodiments of the invention, the tent may comprise an inflated mattress.

In a preferred embodiment, the mattress comprises a first mattress flexible sheet and a second mattress flexible sheet opposed to said first mattress flexible sheet; wherein the first flexible mattress sheet and second mattress flexible sheet are joined to each other to form one or more inflatable chambers.

The inflatable chambers are preferably elongate, and may be arranged lengthwise or widthwise in the tent, or formed in any desired pattern.

The inflatable chambers may be formed between the flexible sheets in the same manner as discussed for the structural support chambers of the arch.

The mattress functions primarily to provide physical support and thermal insulation for a tent user, for example during sleeping.

In some preferred embodiments, the mattress may provide additional structural support to the arch. That is, the arch may be anchored to the mattress. In this manner, the mattress may form an additional structural support element by restraining longitudinal spread of the arch base and so resisting an arch's natural tendency to push outward at the base. Anchoring of the arch to the mattress may comprise direct or indirect joining, preferably direct joining, of at least one of the arch lower ends to the mattress. The joining techniques discussed in this document in relation to first and second flexible sheets of the arch, or by ties, bracing, or abutments. In embodiments where the mattress provides structural support to the arch, the inflatable chambers are preferably aligned lengthwise, which can limit longitudinal extension in the mattress.

The mattress may form a template for pitching the tent. This may aid a user in pitching the tent. In this respect, the mattress may be shaped or configured to indicate positioning of the arch, in particular the base or lower ends of the arch, in relation to the mattress.

In some embodiments the mattress may be provided with indicia designating positions for the arch, in particular the base of lower ends of the arch. Such indicia may take the form of, for example, graphical elements, decorative elements, printings, lacquers, optical coatings, decorative coatings textures, embossments, debossments, inks and combinations of these elements.

In some embodiments, the mattress may be provided with a combination of the above discussed shaping and indicia.

In plan view the mattress may be rectangular, extending in a substantially straight line between the lower ends of the arch. In other embodiments, the mattress may extend beyond the sides of the arch and under the flysheet. In such embodiments, for example, the mattress in plan view may substantially follow the lower boundary of a pitched flysheet. For example, in plan view the mattress may be an elongated octagon, hexagon, other polygon, or have curved sides, to substantially follow the boundary of a pitched flysheet.

The mattress may comprise any of the materials discussed in relation to the first and second flexible sheets of the arch.

In preferred embodiments the mattress comprises the same polymer type as the arch. This can simplify disposal of the tent by recycling or destruction because the mattress and arch can be handled in the same disposal stream. Preferably the arch and mattress are both made of polyethylene, polypropylene, polyethylene terephthalate, polyethylene furanoate, polyester, nylon, or polyvinyl chloride. Preferably the arch and mattress are both made of polyethylene.

The mattress material may typically be placed under greater mechanical stress than the arch and thus may have a greater basis weight and/or thickness than the arch's flexible sheet material.

Preferred basis weights for the mattress materials may be from 10 to 2,000 gsm, preferably from 15 to 1200 gsm, more preferably 20 to 800 gsm, still more preferably 25 to 600 gsm, and most preferably or 30 to 400.

The material flexible sheets preferably have a thickness such that they are compliant and readily deformable for packing, handling, tent pitching, tent striking, transportation, and disposal.

The mattress materials preferably have a thickness of from 10 to 2000 micrometers, more preferably from 15 to 1200 micrometers, more preferably from 20 to 800 micrometers, more preferably from 25 to 600 micrometers, more preferably from 30 to 400 micrometers.

The mattress is made out of flexible sheets, which can allow simple and cost-efficient manufacturing.

For example, the mattress can be made from continuous webs of flexible material. This allows the arch to be manufactured in a continuous, fully automated process in which a continuous web of material is processed over a sequence of steps, resulting in large quantities of identical products.

A method of manufacturing the mattress may be similar to that of the manufacturing process discussed above for the arch. Such a process may include the steps of: providing a first flexible sheet; providing a second flexible sheet opposed to said first flexible sheet; and joining the first flexible sheet and the second to each other to form one or more inflatable chambers between the first flexible sheet and second flexible sheet.

Groundsheet

A groundsheet is a sheet of flexible material that is laid out on the ground as the lowest layer of a tent. A groundsheet material typically has water resistance and the groundsheet typically forms a water resistant barrier against ingress of water and/or detritus to the tent's habitable volume.

In preferred embodiments, the arch may be anchored to the groundsheet. In this manner, the groundsheet may form an additional structural support element by restraining longitudinal spread of the arch base and so resisting an arch's natural tendency to push outward at the base.

Anchoring of the arch to the groundsheet may comprise direct or indirect joining, preferably direct joining, of at least one of the arch lower ends to the groundsheet. The joining techniques discussed in this document in relation to first and second flexible sheets of the arch, or by ties, bracing, or abutments.

In some embodiments the groundsheet may comprise upwardly extending peripheral walls.

The raised peripheral walls may preferably be positioned to form abutments against which the base of the arch can abut. This can restrain the longitudinal spread of the arch base and so resist an arch's natural tendency to push outward at the base. The structure of the tent can so be more secure.

The peripheral walls may preferably extend along substantially the whole periphery of the groundsheet, forming a basin or 'bathtub' configuration. Such a configuration can aid in preventing ingress of ground-surface water to the habitable volume.

The raised peripheral walls may preferably extend vertically from 1 to 30 cm, more preferably from 5 to 20 cm, more preferably from 8 to 15 cm, from the groundsheet.

The groundsheet preferably forms a template for pitching the tent. This may aid a user in pitching the tent. In this respect, the groundsheet may be shaped or configured to indicate positioning of the arch, in particular the base of the arch, in relation to the groundsheet; positioning of the flysheet, in particular the anchoring points, in relation to the groundsheet; and/or positioning of the mattress in relation to the groundsheet.

In some embodiments the groundsheet may extend laterally to two opposed apexes, the apexes defining predetermined positions for anchoring the flysheet relative to the tent. The apexes are preferably positioned at a lateral midline of the tent.

In some embodiments the groundsheet may be provided with indicia designating positions for the arch, in particular the base of the arch; positioning of the flysheet, in particular the anchoring points; and/or positioning of the mattress. Such indicia may take the form of, for example, graphical elements, decorative elements, printings, lacquers, optical coatings, decorative coatings textures, embossments, debossments, inks and combinations of these elements.

In some embodiments, the groundsheet may be provided with a combination of the above discussed shaping and indicia.

The groundsheet may comprise any conventional materials used in the art of tents for groundsheets.

In preferred embodiments the groundsheet comprises the same polymer type as the arch. This can simplify disposal of the tent by recycling or destruction because the groundsheet and arch can be handled in the same disposal stream. Preferably the arch and groundsheet, and optionally the mattress, are all made of polyethylene, polypropylene, polyethylene terephthalate, polyethylene furanoate, polyester, nylon, or polyvinyl chloride. Preferably the arch and groundsheet, and optionally the mattress, are all made of polyethylene.

The groundsheet material may typically be placed under greater mechanical stress than the arch and thus may have a greater basis weight and/or thickness than the arch's flexible sheet material.

Preferred basis weights for the groundsheet may be from 10 to 2,000 gsm, preferably from 15 to 1200 gsm, more preferably 20 to 800 gsm, still more preferably 25 to 600 gsm, and most preferably or 30 to 400 gsm.

The groundsheet preferably has a thickness such that it is compliant and readily deformable for packing, handling, tent pitching, tent striking, transportation, and disposal.

The groundsheet preferably has a thickness of from 10 to 2000 micrometers, more preferably from 15 to 1200 micrometers, more preferably from 20 to 800 micrometers, more preferably from 25 to 600 micrometers, more preferably from 30 to 400 micrometers.

Embellishment

The arch, flysheet, groundsheet and mattress of the tent may be readily adorned with embellishments. This is at least partly because these components comprise flexible sheet materials, which can be easily visually embellished, e.g. by printing, as conformable webs, before they are formed into the tent components.

Visual embellishments may include indicia, graphical elements, decorative etchings, printing, lacquers, optical coatings, decorative coatings, ornamental textures, embossments, debossments, inks, and combinations of these elements. Visual embellishments refer to a visual element intended to provide a decoration or to communicate information. Examples of graphics include one or more of any of the following: colors, patterns, designs, images, and the like.

Visual embellishment may be provided to any surface of the tent. Application of visual embellishment to an outer surface of the flysheet may be preferred because it is this surface that is most readily externally visible.

The visual embellishment may have any of a plethora of uses, for example, they may aid in identifying a particular tent within a field of many similar tents; may indicate characteristics of the tent; may refer to a brand name of the tent supplier or an event (e.g. outdoor music festival) at which the tent is used; .

Functional embellishment may include functional printed textures, printed electronics (such as Near Field Communication or Radio Frequency ID technologies), scented coatings, responsive coatings and smart coatings, including thermal chromics, temperature sensitive coatings, and environmentally responsive coatings.

Tent Material Make Up

The tent is preferably composed of material types that are easy to dispose of, recycle, destruction. The tent may comprise polyethylene, polypropylene, polyethylene terephthalate, polyethylene furanoate, polyester, nylon, or polyvinyl chloride. Preferably the tent is made of polyethylene.

Preferably the tent comprises at least 60 wt %, based on the total weight of the tent components, of thermoplastic polymer, more preferably at least 70 wt %, still more preferably at least 85 wt %, still more preferably at least 95 wt %, and most preferably at least 98 wt %.

Preferably the tent comprises at least 60 wt %, based on the total weight of the tent components, of a single polymer type selected from the types polyethylene, polypropylene, polyethylene terephthalate, polyethylene furanoate, polyester, nylon, or polyvinyl chloride. More preferably the weight percentage is 70 wt %, still more preferably 85 wt %, still more preferably 95 wt %, and most preferably at least 98 wt %. More preferably, at least 50 wt % of the tent is a single polymer type, more preferably at least 60 wt %, more preferably at least 70 wt %, still more preferably 85 wt %, and still more preferably 95 wt %. Preferably the polymer type is polyethylene.

It is preferable that the tent comprises a minimum of support structures other than the inflated arch. Preferably, the tent is free of structural support poles. Conventional structural support poles are made of metal(-alloys), glass-fiber and/or carbon fiber. Such poles can be expensive to manufacture, add weight to the tent, and can be difficult to dispose of, e.g. by recycling or destruction, leading to high environmental impact because they are highly durable.

It is preferable that the tent is free of closing structures such zippers or clasp lockers. Such components can complicate manufacture because of the additional steps required to incorporate them into sheet materials, and they can increase difficulties in disposal, especially recycling, because of the need to sort them to distinct recycling/disposal streams.

It is preferable that the tent of the invention contains a minimum of metal(-alloy) materials. Preferably the tent comprises less than 1 wt % of metal(-alloy) based on the total weight of the tent components, preferably less than 0.5 wt % of metal(-alloy) and more preferably the tent is substantially free of metal(-alloy) materials.

It is preferable that the tent contains a minimum of thermoset polymer materials. Preferably the tent comprises less than 60 wt % of thermoset polymer materials based on the total weight of the tent components, preferably less than 5 wt %, more preferably less than 2 wt %, and most preferably the tent is substantially free of thermoset polymer materials.

It is preferable that the tent contains a minimum of fiberglass and/or carbon fiber materials. Preferably the tent comprises less than 10 wt % of such materials based on the total weight of the tent components, preferably less than 5 wt %, more preferably less than 2 wt %, and most preferably the tent is substantially free of fiberglass and/or carbon fiber materials.

As used herein, reference to "total weight of the tent components" does not include elements or tools used to anchor the tent or its components to a surface, for example to anchor to the ground. That is, fastening systems such as tent pegs, stakes or screws, are not included in the above terms. The fastening systems may be selected from any of those known in the art.

Single-Use/Non-Durable

The inflatable tent of the invention is preferably a non-durable tent. The term "non-durable" refers to a tent that is only temporarily reusable, is disposable, or is single-use. This is in contrast, the term "durable", which refers to a tent that is reusable more than non-durable tents.

The term "temporarily reusable" refers to an inflatable tent that is configured to allow deflation followed by re-inflation a plurality of times. Preferably the tent is configured for no more than four re-inflations, preferably no more than two re-inflations, preferably no more than one re-inflation, after an initial inflation by an end-user, before the tent experiences a failure that renders it unsuitable for use.

As used herein, when referring to an inflatable tent, the term "single-use" refers to an inflatable tent that is configured to be inflated only once by an end-user. A single-use inflatable tent is not configured for re-inflation(s) following deflation. A single-use inflatable tent may be configured to be disposed of following (i.e. as waste, compost, and/or recyclable material) its first use. A single-use inflatable tent may, in some embodiments, be configured to be deflatable only by a permanently damaging action, such as puncturing.

In some single-use embodiments, the tent may be inflatable by one or more one-way inflation openings or inflation valves, and be free of deflation openings or deflation valves.

As used herein, the term "disposable" refers to an inflatable tent that is configured to be disposed of (i.e. as waste, compost, and/or recyclable material). Part, parts, or all of any of the embodiments of the inflatable tents, disclosed herein, can be configured to be disposable.

As used herein the term "recyclable" refers to an inflatable tent that comprises components and/or materials that can be reused. Preferably at least 70% by weight of an inflatable tent is recyclable, preferably at least 80%, preferably at least 85%, more preferably at least 90%, still more preferably at least 95%, and most preferably substantially the entire tent (e.g. greater than 97% by weight of the tent), is recyclable. The weight percentage of the inflatable tent that is recyclable is calculated based upon the materials entered into a recycling process, and not the yield of such a recycling process.

In some embodiments the inflated chambers or the arch and/or the mattress of the tent, may be sealed once inflated, such that deflation is only possible by destructive measures. Sealing may be achieved by use of a one-way valve allowing inflation but not deflation. This may aid in ensuring safe usage of tent that is not constructed for extended usage.

Other objects, advantages, and novel features of the invention will become more apparent from the following detailed description when taken in conjunction with the accompanying drawings.

Kit of Parts

In a further aspect of the invention there is provided a kit of parts comprising an inflatable arch as discussed in any one of more of the embodiments herein, a flysheet as discussed in any one of more of the embodiments herein, and/or optionally one or more of an inflatable mattress as discussed in any one of more of the embodiments herein, and/or a groundsheet as discussed in any one of more of the embodiments herein.

In a further aspect of the invention there is provided a kit of parts comprising:
- an inflatable arch comprising a first flexible sheet and a second flexible sheet opposed to said first flexible sheet; wherein the first flexible sheet and second flexible sheet are joined to each other to form one or more inflatable, structural chambers;
- a flysheet;
- optionally an inflatable mattress; and
- optionally a groundsheet.

In a further aspect of the invention there is provided a kit of parts comprising:
- an arch;
- a flysheet;
- optionally an inflatable mattress; and
- optionally a groundsheet;

wherein the flysheet is configured to be secured for pivotable opening and/or closing about an axis lateral to the length of the arch.

Greenhouse

The arch discussed above (absent the flysheet, mattress and groundsheet) may be implemented as an inflatable greenhouse. In such embodiments the inflatable arch is extends normal to the curve of the arch to form a greenhouse tunnel.

The length of the greenhouse tunnel may be at least 4 metres, preferably at least 6 metres, and more preferably at least 10 metres. The height of the arch in a greenhouse embodiment may be any of the above mentioned heights, but may also be great enough to allow an adult human to stand, preferably at least 1.5 metre, more preferably at least 1.7 metre, and more preferably at least 2 metre.

In the embodiment of a greenhouse, the first and second flexible sheets are preferably substantially transparent to visible light. Preferably they have a light transmittance of visible light of at least about 50%, through the flexible sheets together when inflated, more preferably at least about 60%, more preferably at least about 70%, and more preferably at least about 85%. The flexible sheets may be coloured or non-coloured, and are preferably non-coloured.

When the arch is embodied as a greenhouse, it is preferably comprises the above-described structural support chambers having a natural tendency to form into a curve when inflated. That is, with the structural support chambers being elongate, extending in the curve of the arch, and comprising opposed side-joins between the first and second sheets, wherein the lengths of the opposed side joins are unequal. That is, the length of one side join is greater than the length of an opposed side join. Preferably the opposed side-joins end at the same distance along the circumference of the arch. Once inflated, the structural support chamber will tend to take on an arched configuration as its lowest energy configuration.

In a preferred embodiment, a first side-join of a structural support chamber is substantially straight along the line of the circumference of the arch, and a second side-join of the structural support chamber opposed to the first side-join, is non-straight or non-linear along the circumference of the arch. The second side-join is thus greater in length. Preferably the non-straight side-join is meandering, and more preferably has a wave-form extending in the circumference of the arch.

Such a greenhouse body is simple to produce and can be self-supporting with minimal, or without additional structural supports, such as poles or other rigid, hard-plastic or metal structures.

Any aspects in relation to the inflatable arch discussed for the tent above may be equally incorporated into a greenhouse tunnel.

BRIEF DESCRIPTION OF THE DRAWINGS

The features and advantages of the invention will be appreciated upon reference to the following drawings, given by way of example only, in which:

FIG. 14 shows a side elevation of the inflated arch and an inflated mattress of FIG. 12;
FIG. 15 shows an end elevation of the inflated arch and an inflated mattress of FIG. 12;
FIG. 16 shows a plan view of the inflated arch and an inflated mattress of FIG. 12.

DESCRIPTION OF ILLUSTRATIVE EMBODIMENTS

Figure 1:
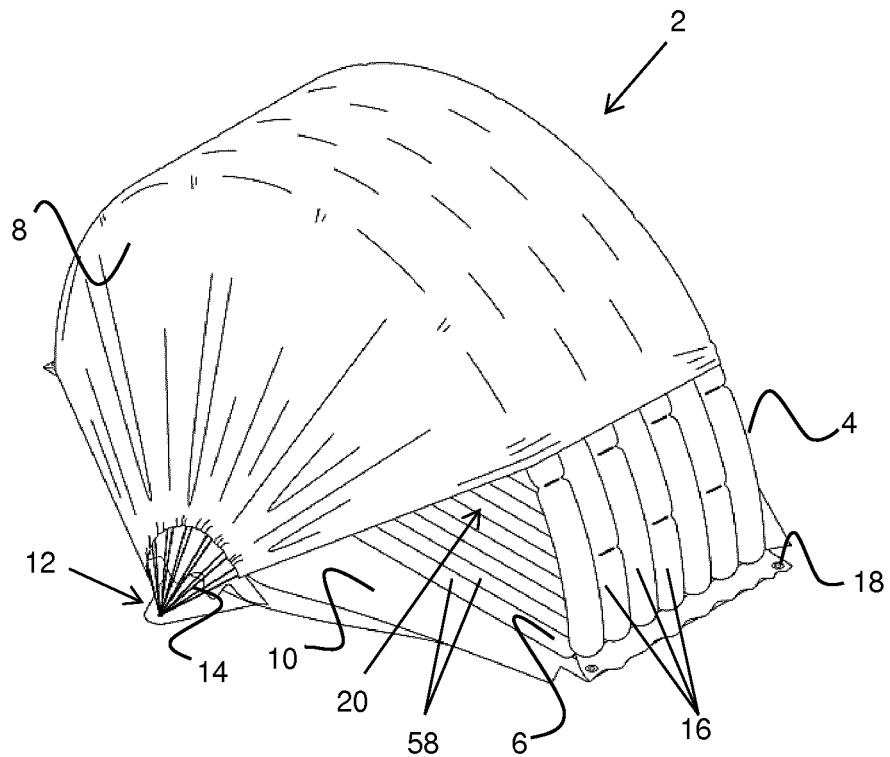
FIG. 1 shows an inflated tent in a partially open state.

The following is a description of certain embodiments of the invention, given by way of example only and with reference to the drawings.

Referring to FIGS. 1 to 4, there is shown an inflated tent 2. The illustrated tent 2 comprises an inflated arch 4, an inflated mattress 6, a flysheet 8, and a groundsheet 10.

Figure 5:
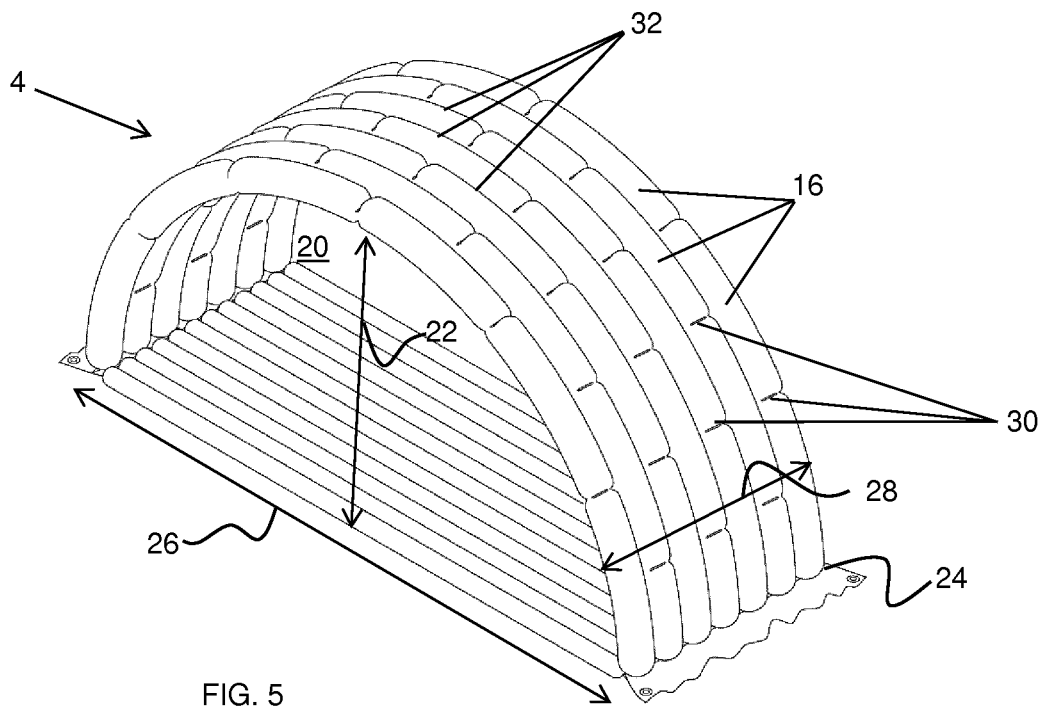
FIG. 5 shows an inflated arch and an inflated mattress.

The inflated arch 4 of FIG. 1 is shown in more detail in FIG. 5.

The inflated arch 4 has a height 22 (also known as a rise) that is the perpendicular distance from the arch's highest internal point to the plane of the base of the arch. The base of an arch is where the arch rests its lower ends 24 upon a supporting surface. The arch 4 also has a length 26, which is the shortest distance between the internal surfaces of the opposed lower ends 24 of the arch 4; and a width 28, which is the lateral distance at right angles to the length 26.

The arch 4 encompasses a habitable volume 20. The arch may be sized to provide a one-person tent or a two-person tent. The illustrated embodiment of FIGS. 1 to 5 is a one-person tent and has a width of from about 60 cm to about 90 cm.

The inflated arch 4 comprises a first flexible sheet 72 and a second flexible sheet 74 opposed to the first flexible sheet 72 (see also FIGS. 13 and 25), wherein the first flexible 72 sheet and second flexible sheet 74 are joined to each other to form one or more structural support chambers 16. In the illustrated arch 4 the structural support chambers 16 are gas-filled to a pressure greater than 1 bar, preferably about 1.1 to 2.0 bar. The structural support chambers 16 are thus inflated, for example with air or $N_2$, to create tension in the first and second flexible sheets 72,74, providing a stiffened, semi-rigid of rigid cell that acts as a support element in the arch 4.

The illustrated inflated structural support chambers 16 are elongate and extend in the curve of the circumference of arch 4. The structural support chambers 16 in the embodiment of FIGS. 1 to 5 extend only part-way along the circumference of the arch and are defined at their first and second ends by lateral flexural lines 30. The flexural lines 30 are formed by end joins between the first and second flexible sheets 72, 74, of the arch 4.

The structural support chambers 16 are so provided as a series of structural support chambers 16 extending between the lower ends 24 of the arch. The end joins may extend fully across the end of the structural support chambers 16, forming an end-seal between the in series chambers 16; or the join lines may be provided with one-way or two-way valves to allow restricted passage of inflating material therebetween, or the join lines may extend only partially across the end of the structural support chambers 16 allowing free passage of inflating material between the in-series structural support chambers 16.

In addition, a plurality of series of structural support chambers 16 are provided across the width 28 of the arch 4, separated by longitudinal side join lines 32. The side join lines 32 may extend fully along a side of the structural support chambers 16, forming a side-seal between the laterally adjacent chambers 16; or the longitudinal join lines 32 may be provided with one-way or two-way valves to allow restricted passage of inflating material therebetween, or the lateral join lines 32 may extend only partially along the length of the structural support chambers 16 allowing free passage of inflating material between the laterally adjacent structural support chambers 16.

As can be seen best in FIG. 5, the flexural lines 22 of the adjacent series are off-set in the curve of the arch 4. This provides flexibility to achieve the curve of the arch 4 while aiding in maintenance of structural rigidity to define a secure habitable volume 20.

Figure 6:
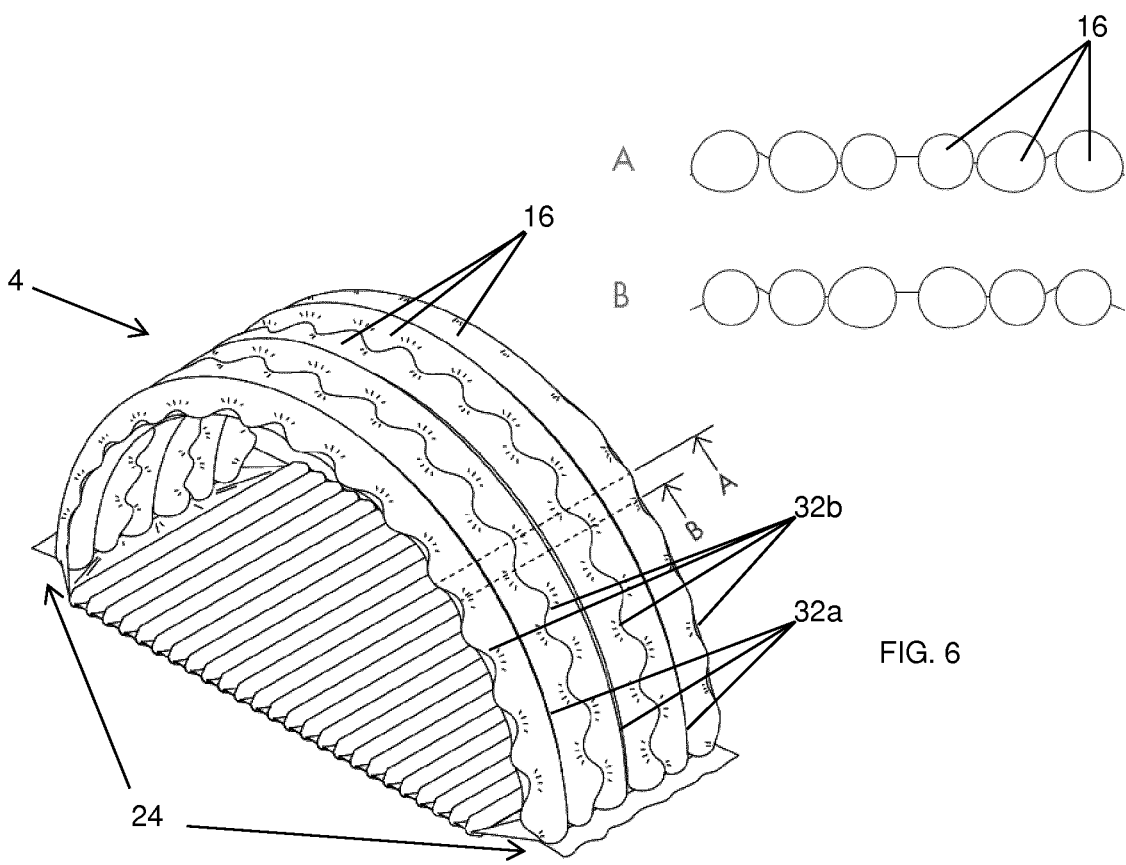
FIG. 6 shows an inflated arch and an inflated mattress, and transverse cross-sections of the arch.

Referring to FIG. 6, there is illustrated a further embodiment of an inflated arch 4, in which the structural support chambers 16 are configured with an inherent tendency to curve when inflated. As can be seen, the structural support chambers 16 are elongate and extend in the curve of the arch 4. Each structural support chamber 16 extends for substantially the entire circumference of the arch 4, but in other embodiments some or all of the chambers 16 could extend for only a part of the circumference.

The structural support chambers 16 comprise opposed side joins 32a, 32b between the first and second sheets. The lengths of the opposed side joins are unequal. That is, the length of a first side join 32a is less than the length of an opposed second side join 32b, over the same vector distance in the length of the arch 4 circumference.

In the embodiment of FIG. 6, the side joins 32a and 32b extend for the full circumference of the arch, and so end at the same points along the circumference of the arch 4. The illustrated first side join 32a is substantially straight along the circumference of the arch, following a vector line of shortest distance between the arch lower ends 24. The illustrated second side join 32b extends inline with the circumference of the arch 4, but is non-straight or non-linear. Thus compared to the first side-join 32a, the second side-join 32b follows a greater path to achieve the same vector distance over the circumference. The non-straight second side-join 32b meanders over the circumference of the arch 4, and, as in FIG. 6, is preferably a wave-form extending along the circumference of the arch 4. As can also be seen, the second sides 32b of laterally adjacent structural support chambers are complementary in shape along the boundary between them, and so the adjacent second sides nest, mesh, and/or conform with one another.

When inflated, the structural support chambers 16 tend to take on a curved or arched configuration as their lowest energy configuration in order to as far as possible balance the tension variations created across the uneven first and second side join lines 32a, 32b. In this respect, FIG. 6 further illustrates cross-sections through the inflated structural support chambers 16 along lines A and B of the inflated arch 4. As can be seen, on account of the variation between the first and second side join lines 32a, 32b, the cross-section of the inflated chambers 16 remains oval, and cannot reach the lowest energy configuration of purely circular. Thus the chamber 16 arches in an attempt to achieve as close as possible to a circular cross-section.

Figure 7:
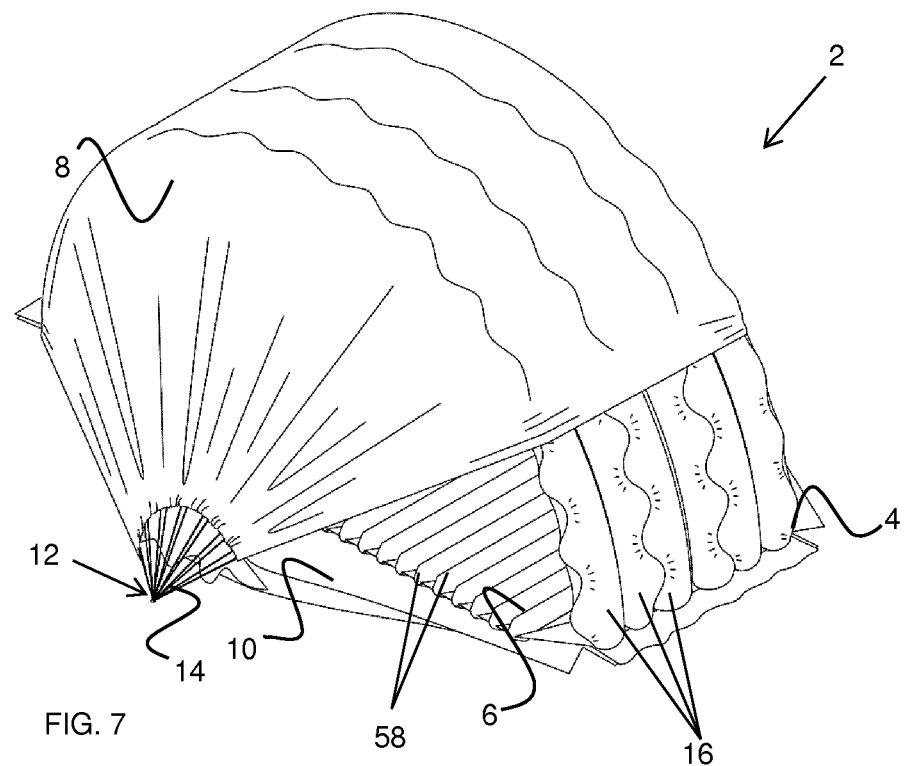
FIG. 7 shows an inflated tent in a partially open state.

FIG. 7 illustrates a tent 2 comprising the inflated arch 4 of FIG. 6, and a flysheet 8 pitched in tension thereover. The flysheet 8 is similar to that of the embodiment of FIG. 1.

Figure 8:
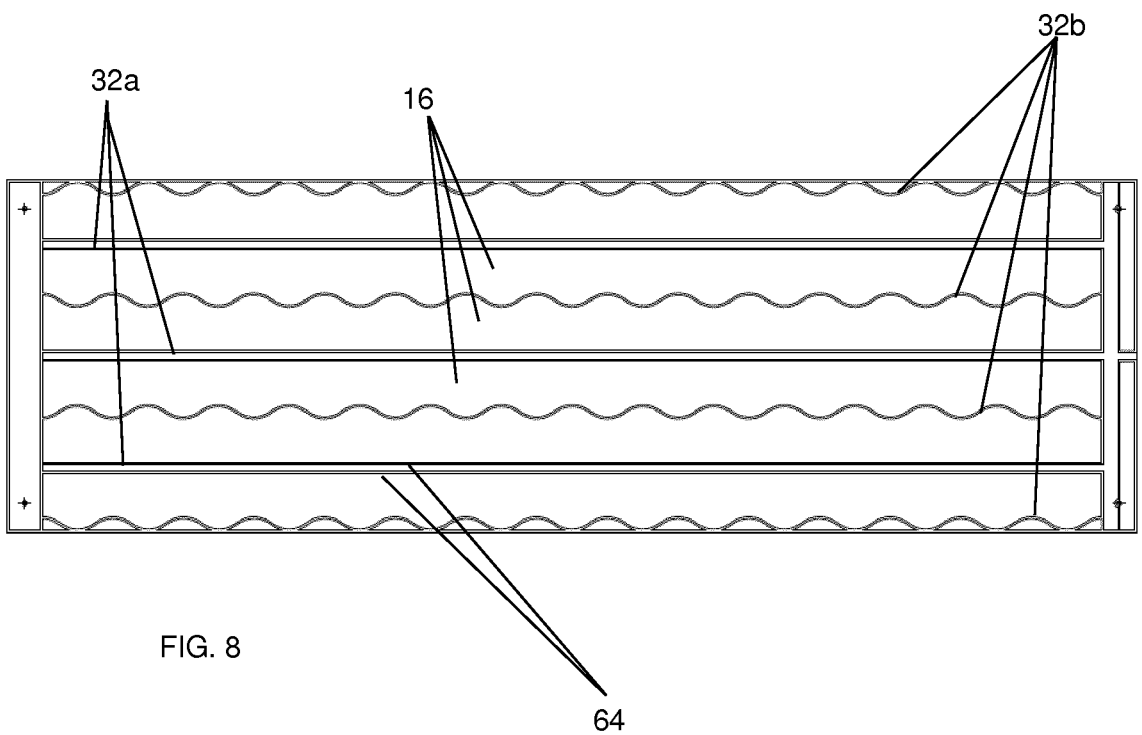
FIG. 8 is a plan view of an uninflated arch of FIG. 6.

Referring to FIG. 8, there is shown a plan view of an uninflated arch 4 of FIG. 6. The wave-form of the second side joins 32b can be clearly seen, as well as the straight form of the first side joins 32a. A series of one-way valves 64 are provided along the first side joins, by which the structural support chambers 16 can be inflated with gas, preferably air.

The tents 2 of FIGS. 1-4 and 7 are further provided with an inflatable mattress 6. The mattress is made up of a first mattress flexible sheet 80 and a second mattress flexible sheet 81 opposed to the first mattress flexible sheet 80 (see also FIG. 13). The first flexible mattress sheet 80 and second mattress flexible sheet 81 are joined to each other to form one or more inflatable chambers 58. In plan view the illustrated mattress 6 is rectangular, extending in a substantially straight line between the lower ends of the arch, although other forms may be applied.

Figure 9:
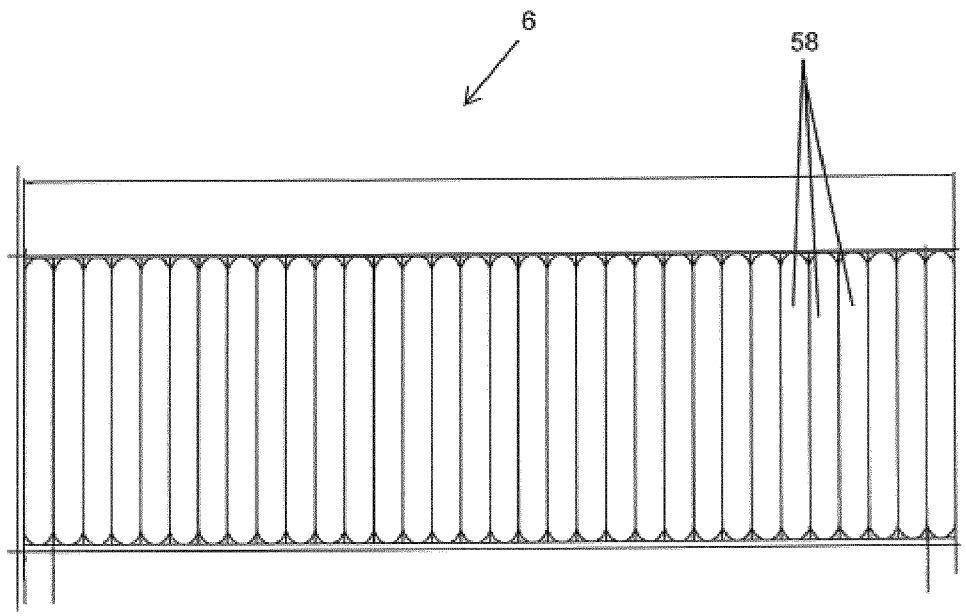
FIG. 9 is a plan view of an uninflated mattress of FIG. 6.

In FIG. 1, the inflatable mattress has elongate inflatable chambers 58 in the length of the tent 2. In FIG. 9, the inflatable mattress 6 has laterally extending inflatable chambers 58. Other chamber patterns for the mattress 6 may also be used.

Figure 10:
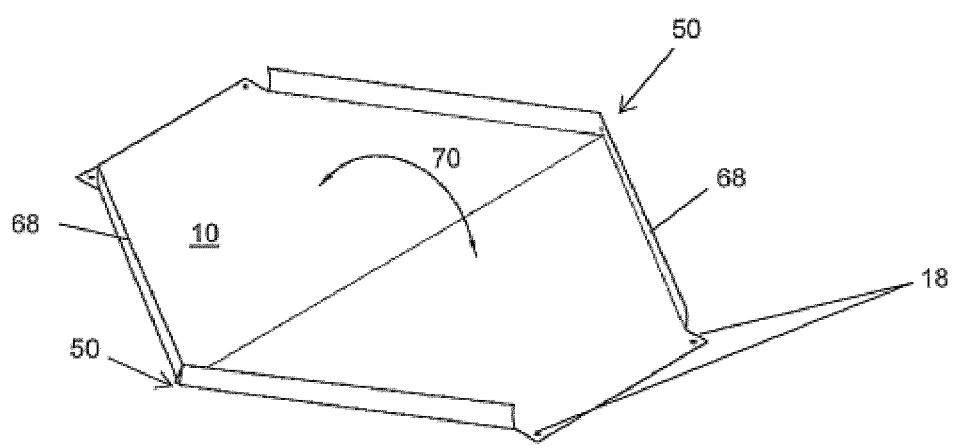
FIG. 10 shows a groundsheet.

Referring to FIG. 10, there is shown a plan view of the groundsheet 10 of FIGS. 1 to 4 and 7. The groundsheet 10 is provided with anchoring eyelets 18 by which the groundsheet 10 may anchored to the ground by any usual means, such as tentpegs. The groundsheet 10 extends to lateral apexes 50 which may indicate to a user pitching the tent 2, the position for anchoring the flysheet 8.

The illustrated groundsheet 10 is provided with upwardly extending peripheral walls 68. The peripheral walls 68 may aid in reducing or preventing flow or other ingress of water, e.g. ground-surface water, or precipitation, to the upper surface of the groundsheet 10.

Figure 11:
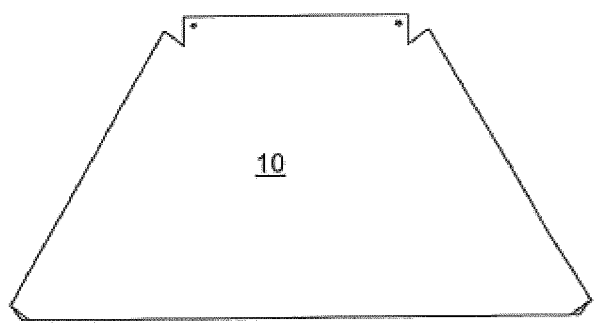
FIG. 11 shows the groundsheet of FIG. 10 when folded.

As further shown in FIG. 10, the groundsheet 10 can be folded, arrow 70, about its centre-line, for easy packaging. FIG. 11 illustrates the groundsheet 10 when folded.

Referring to FIGS. 12-16, there is illustrated a further embodiment of an inflated arch 4, and inflated mattress 6. The structural support chambers 16 of the arch 4 are similar to those of the embodiment of FIG. 6, and are configured with an inherent tendency to curve when inflated.

Figure 12:
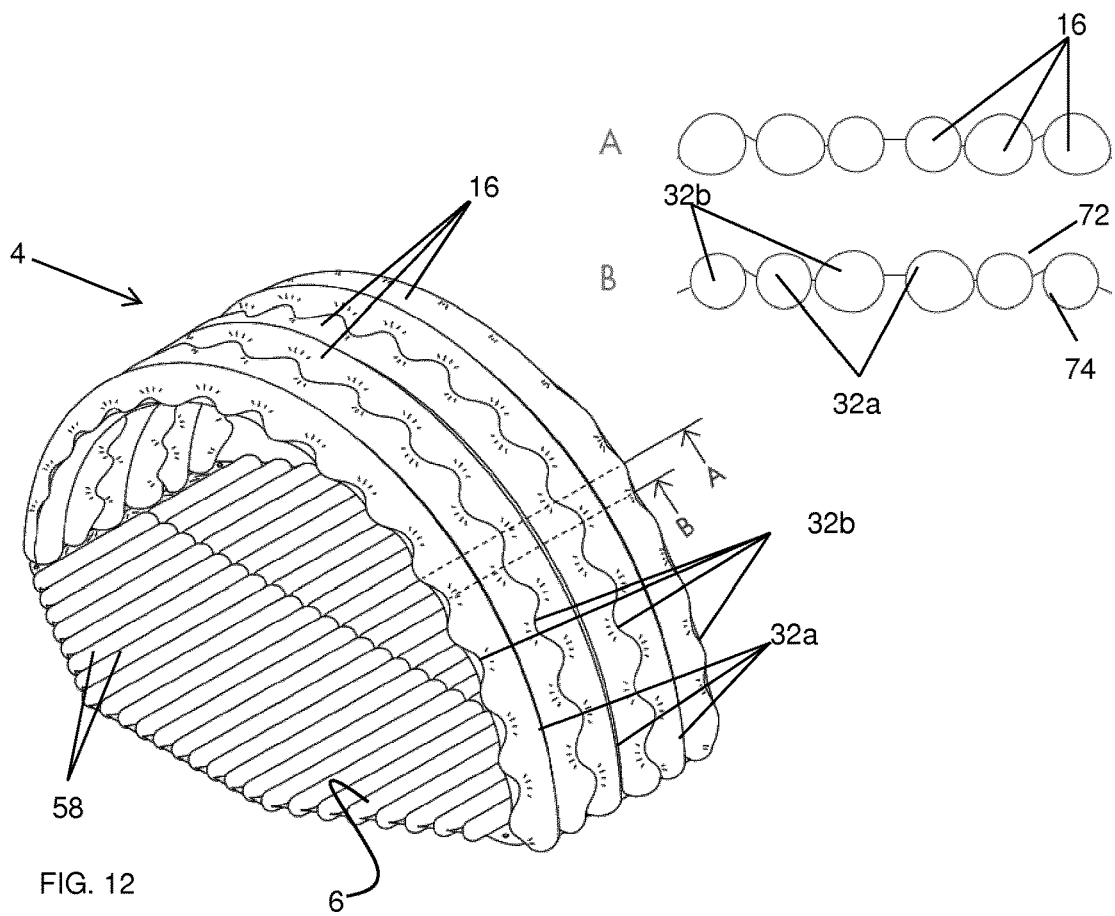
FIG. 12 shows an inflated arch and an inflated mattress, and transverse cross-sections of the arch.
Figure 13:
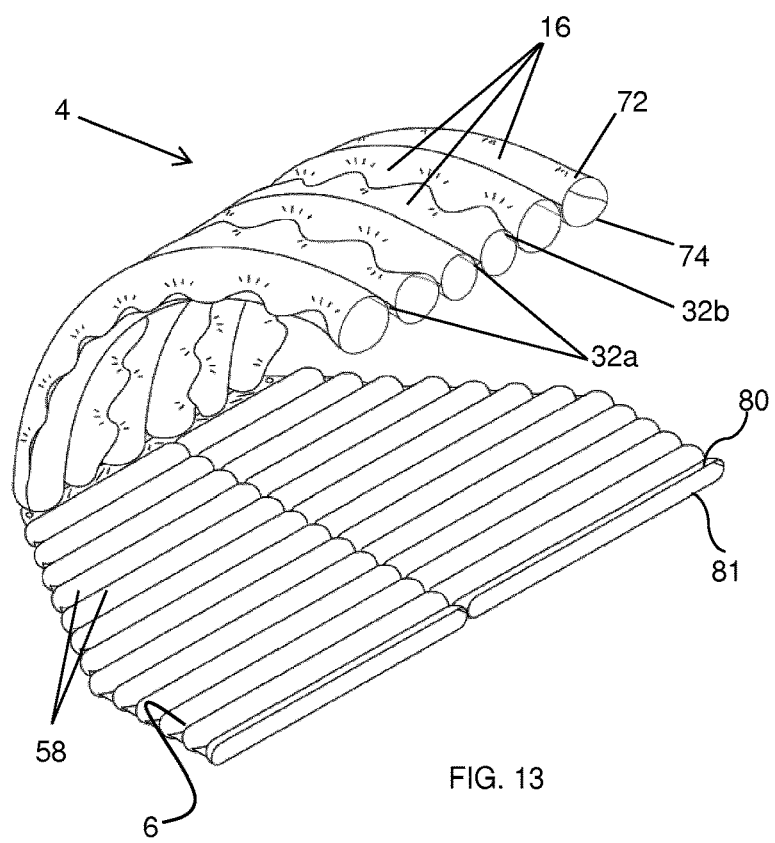
FIG. 13 shows a transverse cross-section of the inflated arch and an inflated mattress of FIG. 12.
Figure 17:
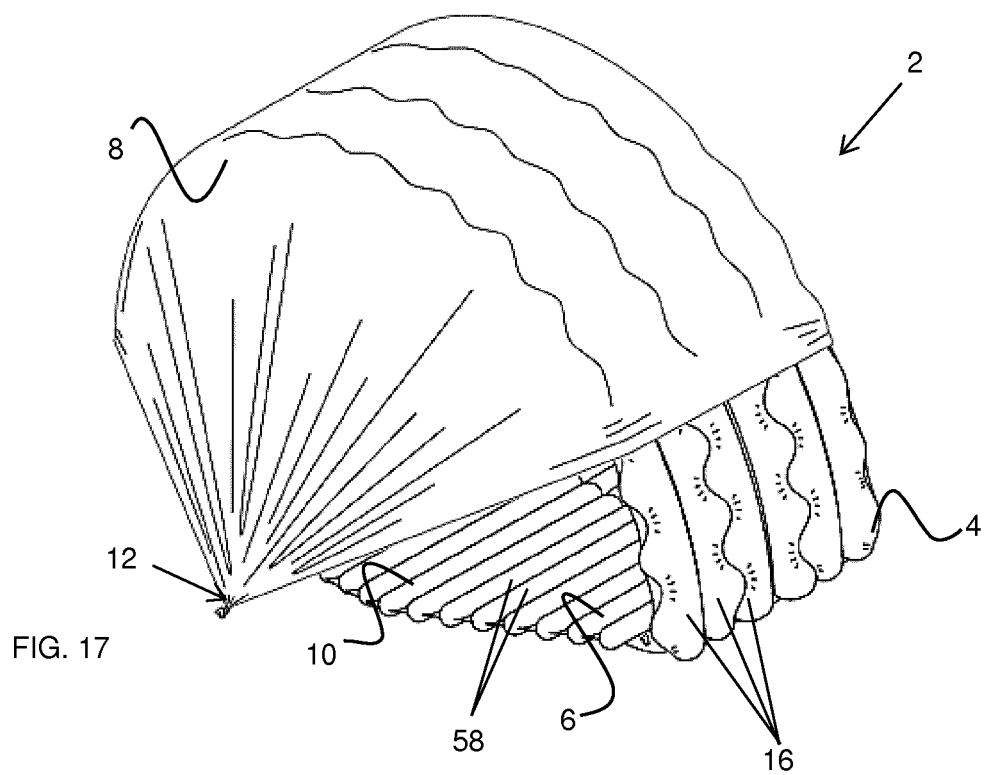
FIG. 17 shows an inflated tent based on the arch and an inflated mattress of FIG. 12.
Figure 18:
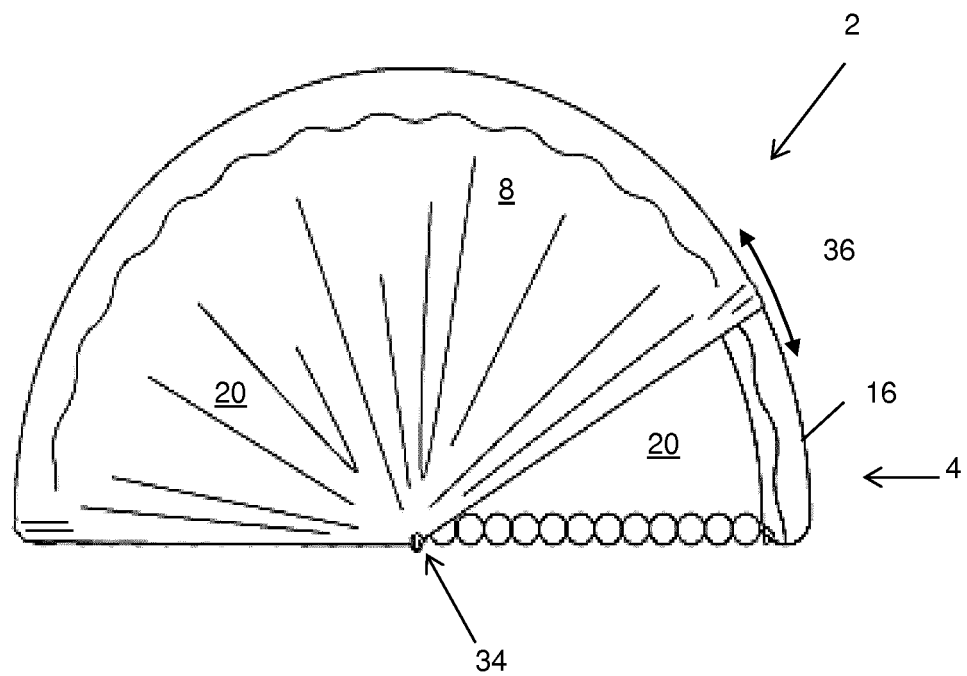
FIG. 18 shows a side elevation of the inflated tent of FIG. 16.
Figure 19:
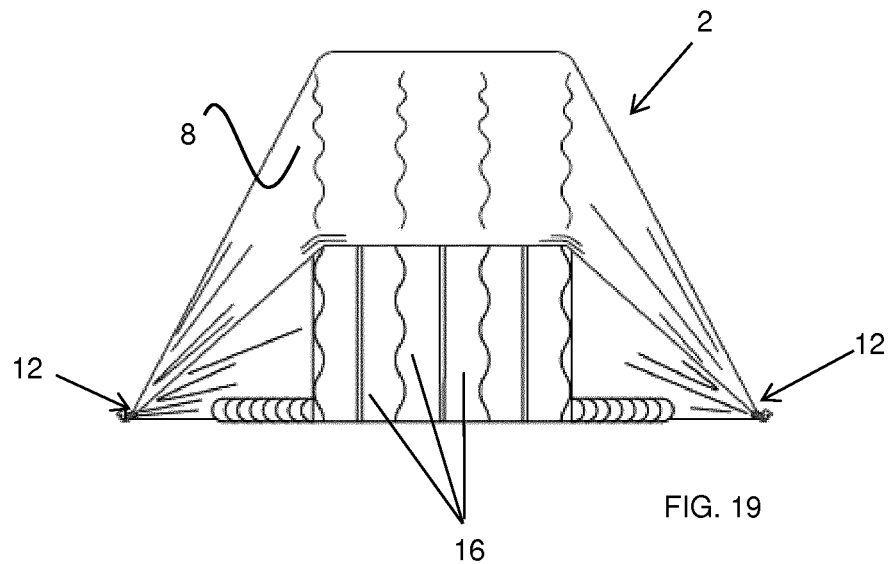
FIG. 19 shows an end elevation of the inflated tent of FIG. 16.
Figure 20:
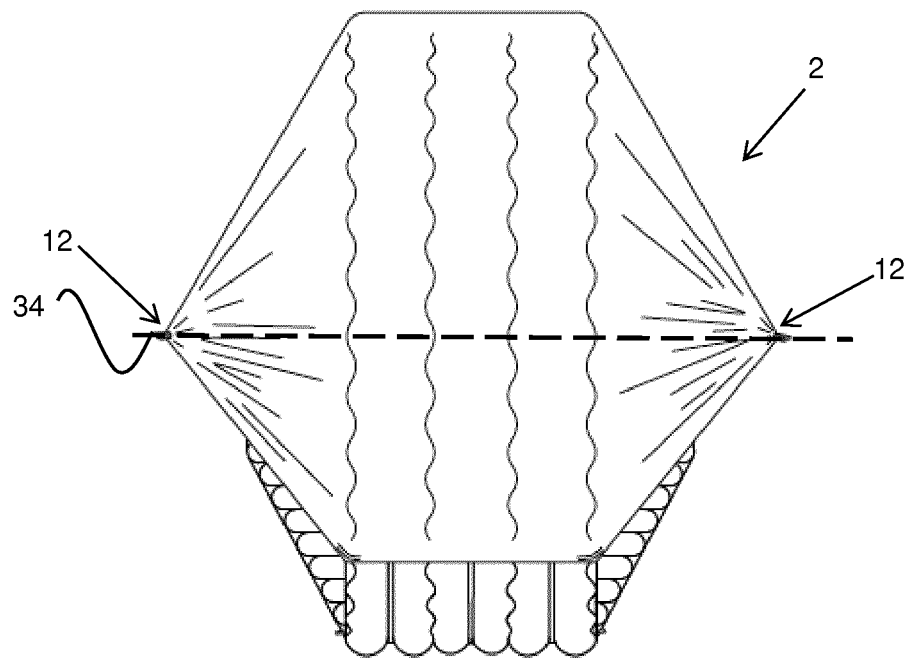
FIG. 20 shows a plan view of the inflated tent of FIG. 16.

FIG. 13 shows a transverse cross-section of the arch and mattress of FIG. 12. The inflated arch 4 comprises a first flexible sheet 72 and a second flexible sheet 74 opposed to the first flexible sheet 72, wherein the first flexible 72 sheet and second flexible sheet 74 are joined to each other along joins 32a and 32b, to form one or more structural support chambers 16, which are gas filled to a pressure greater than 1 bar. The mattress of FIG. 13 comprises a first mattress flexible sheet 80 and a second mattress flexible sheet 81 opposed to the first mattress flexible sheet 80. The first flexible mattress sheet 80 and second mattress flexible sheet 81 are joined to each other to form one or more inflatable chambers 58. The join is achieved in a similar manner to the join between the flexible sheets of the arch 4.

In FIGS. 12-16, the illustrated mattress 6 is shaped to extend laterally beyond the sides of the arch 4. This increases the area of insulation and comfort provided by the mattress 6 within the habitable volume 20, and can aid in increasing the useful sleeping surface area for one or more persons.

Referring to FIGS. 17-20, there is shown a tent 2 comprising the inflated arch 4 and mattress 6 of FIGS. 12-16, with a flysheet 8 pitched in tension thereover. As can be seen, the mattress 6 substantially follows the lower boundary of the pitched flysheet 8 when it is closed. This can make maximum use of the area under the flysheet 8 for insulation, comfort and sleeping surface area.

Figure 21:
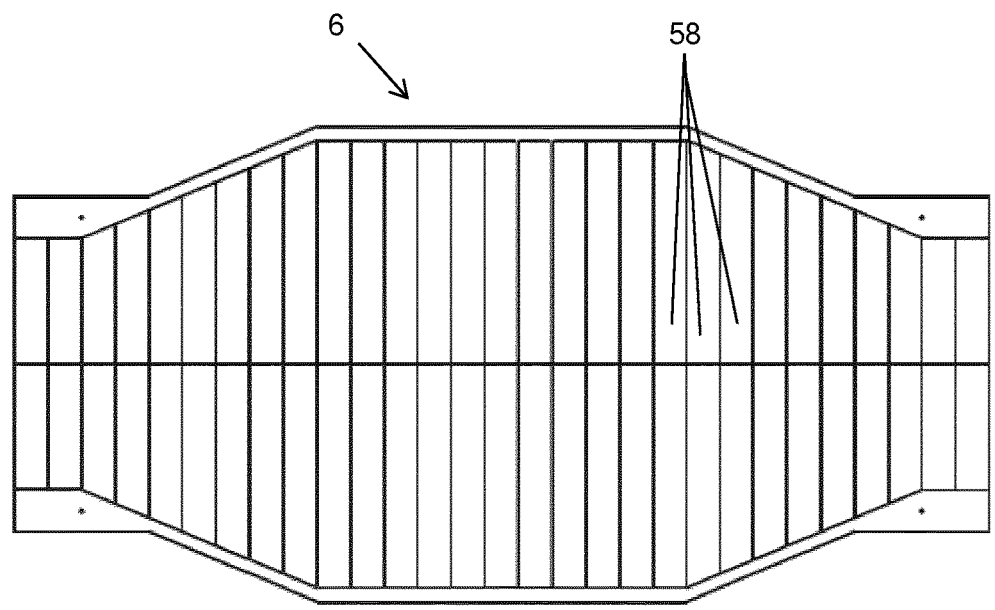
FIG. 21 is a plan view of an uninflated mattress used in the tent of FIG. 16.

Referring to FIG. 21, there is shown a plan view of the uninflated mattress 6 of FIGS. 12-20, having laterally extending inflatable chambers 58. The mattress 6 is substantially an elongated octagon, although other forms, such as (elongated) hexagon, other polygon, or curved sides, may be used, that can substantially follow the boundary of a pitched flysheet.

The inflatable chambers of the mattress 6 are formed between the flexible sheets in the same manner as discussed for the structural support chambers of the arch.

Referring again to FIGS. 1 to 4 and 7, the flysheet 8 is comprised of a flexible sheet, and is pitched over the inflated arch 4. The flysheet 8 is pulled into tension with the inflatable arch 4 by anchoring at flysheet anchor-points 12 in the ground. As can best be seen in FIGS. 3 and 4, two flysheet anchor-points 12 are provided, one on either side of the arch 4. The flysheet anchor-points 12 are positioned on a midline of the length of the tent 2. The flysheet anchor-points 12 are laterally distanced from the sides of the inflated arch 4.

Figure 2:
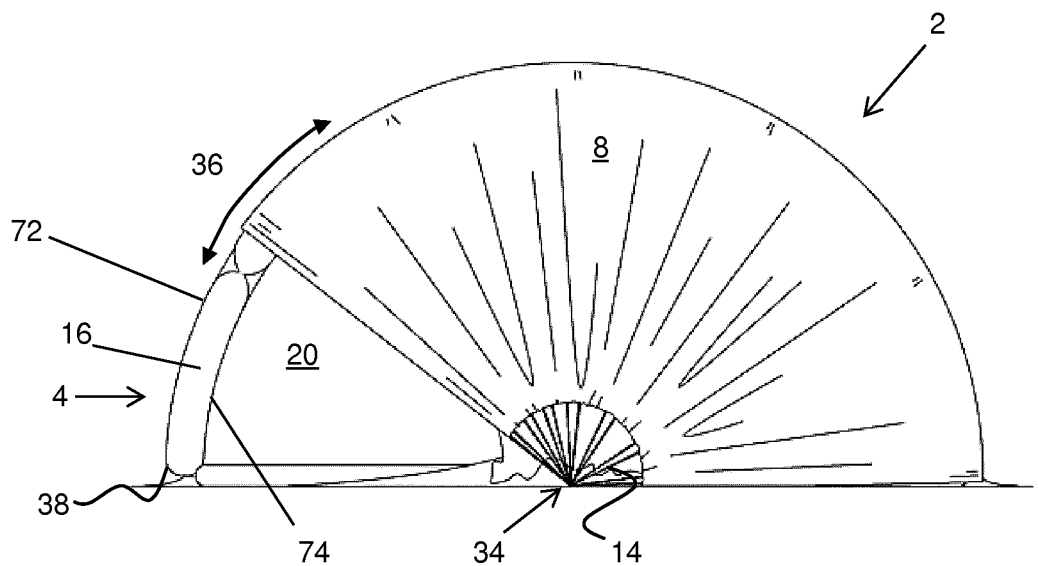
FIG. 2 is a side elevation of the inflated tent of FIG. 1.
Figure 3:
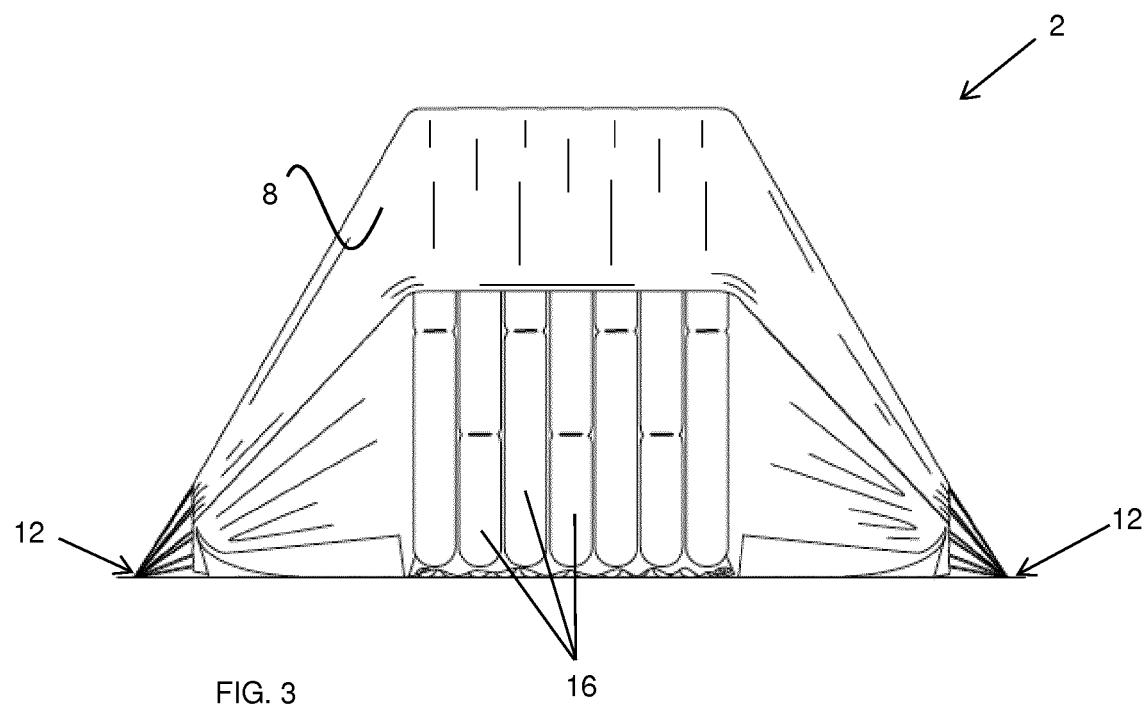
FIG. 3 is an end elevation of the inflated tent of FIG. 1.
Figure 4:
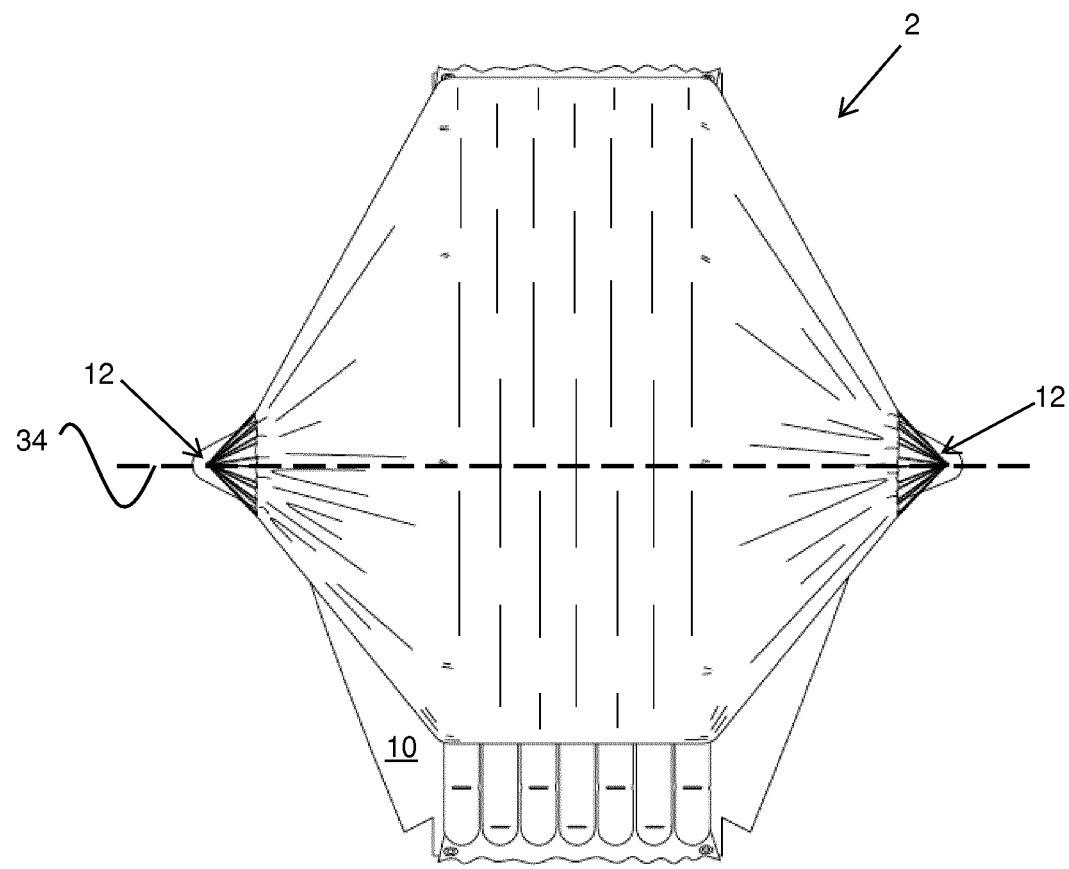
FIG. 4 is a plan view from above, of the inflated tent of FIG. 1.

The anchor-points 12 form a virtual axis 34 about which the flysheet can pivot to and fro, i.e. back and forth, over the arch 4, arrow 36 in FIG. 2. In this manner the flysheet can be pivoted open and closed over the arch to selectively provide access to the habitable volume 20, or to close off the habitable volume 20 at the side openings of the arch. In FIGS. 1 through 4, the flysheet 8 is partially open.

The flysheet 8 is pitched in tension against the arch 4, and so remains open, closed and/or partially open or closed, by frictional engagement with the arch 4. This can allow tent 2 to be absent of added closure devices such as zippers, clasp lockers or other hard plastic, thermoset plastic, or metal components, such as may be normally required in tents. The tent 2 is thus susceptible to ready disposal, especially by recycling.

Preferably in a closed position an end-edge of the flysheet 8 may be pulled by tension under a lip 38 at a base of the arch 4. This provides a still more secure closing of the flysheet 8 over the habitable volume 20.

Figure 22:
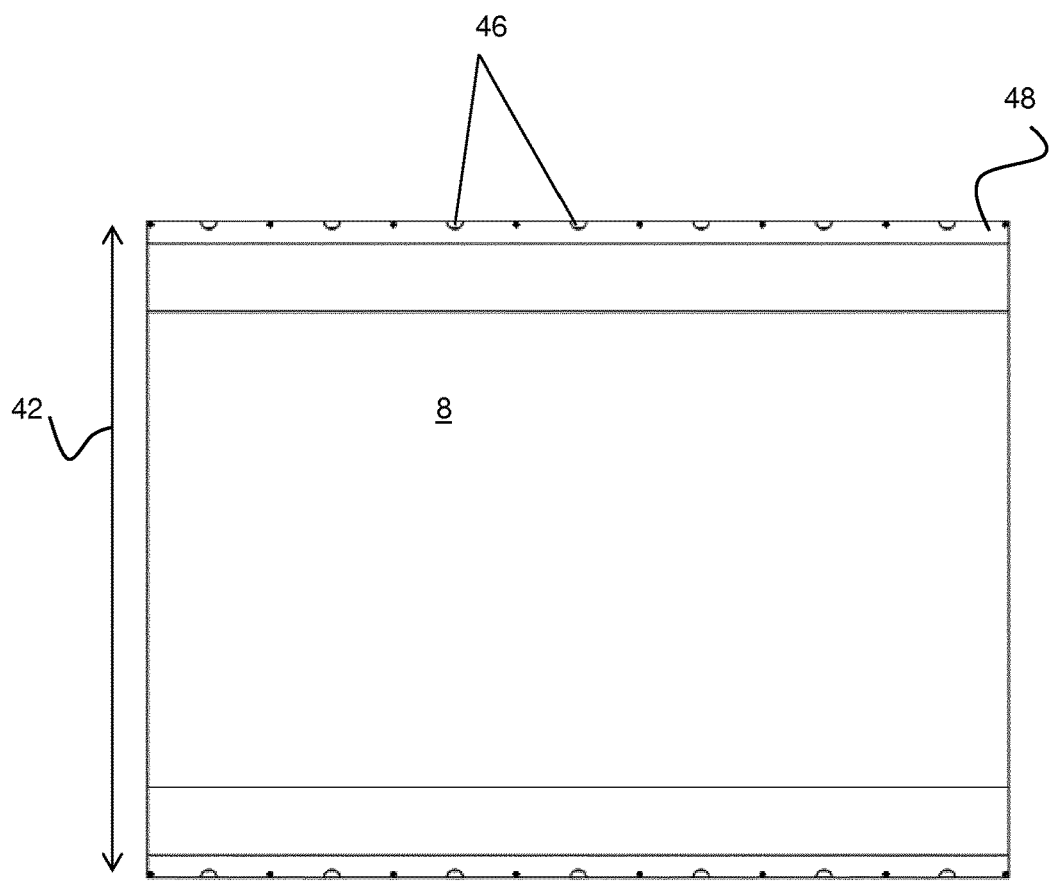
FIG. 22 is a plan view of a flysheet visible in FIGS. 1-4, when unpitched and laid out.

The pivoting opening and closing configuration also allows the flysheet 8 to be of a simple construction. Referring to FIG. 22, there is shown a plan view of the flysheet 8 of FIGS. 1-4, when unpitched and laid out.

The illustrated flysheet 8 has a length 40 and a width 42. Such a rectangular flysheet can be readily formed from a continuous sheet material, for example from a roll of sheet material. The flysheet sides comprise a channel 48 that can be formed by folding and joining (e.g. by heat sealing) the edge of the flysheet 8 upon itself. A drawcord 14 (shown in FIGS. 1 through 4 and 7) can be incorporated in each channel 48, and extends externally via side apertures 46. The drawcord 14 acts as an anchor line or guy and can be anchored to one of anchor points 12 to pitch the flysheet 8. Pulling the drawcord 14 ravels or collects the side of the flysheet towards the anchor point 12, as shown in FIGS. 1 through 4 and 7. The embodiment in FIG. 22 has seven equidistant apertures, however, other configurations are possible.

Figure 23:
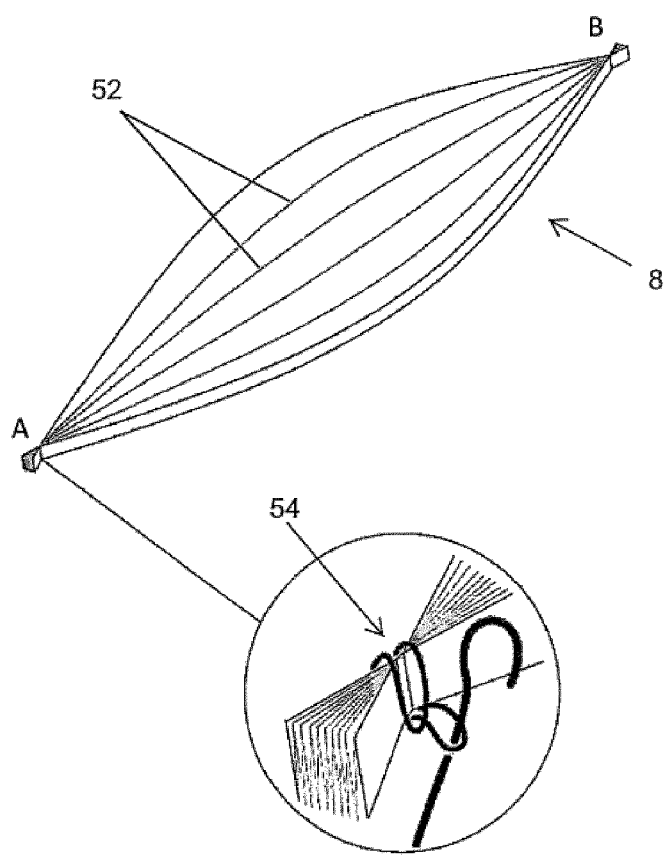
FIG. 23 is shows a flysheet from the tent of FIG. 16.
Figure 24:
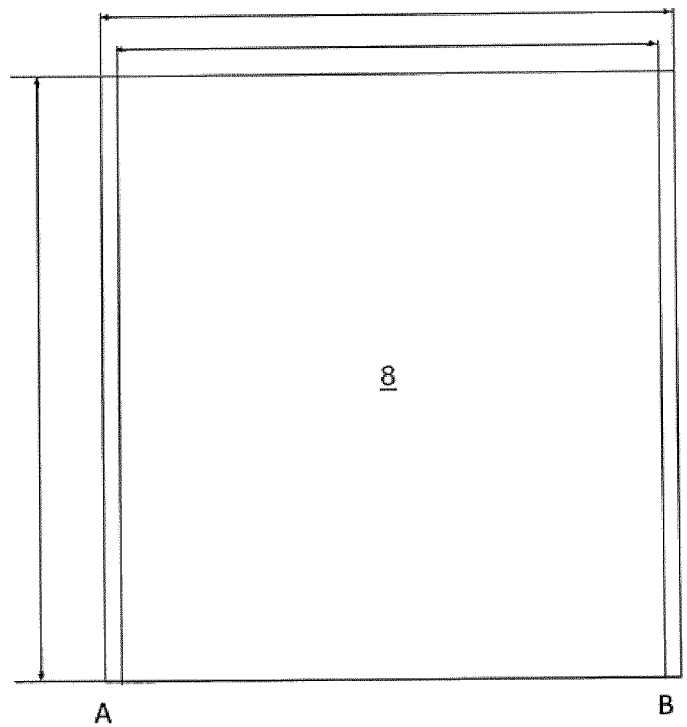
FIG. 24 shows the flysheet of FIG. 23, when laid out.

Referring again to FIGS. 17 to 20, an alternative embodiment of a flysheet 8 is shown. Further detail of the flysheet 8 is shown in FIGS. 23 and 24. The illustrated flysheet 8 is provided with laterally extending fold-lines 52, giving the flysheet 8 a concertina form. This may aid in a smooth opening and closing of the flysheet 8 and in maintaining tension in the flysheet 8 in both open and closed positions.

The flysheet 8 is collected at its sides (A, B) and anchored by a looped guy 54 to a tent peg. The looped guy 54 is an illustrative embodiment only. Alternatives may include heat sealing the flysheet ends into ravelled or concertina forms, with attachment to a peg or similar via, for example, an aperture, preferably a punched aperture. A further alternative may include provision of an injection molded part with fastening features, although this may be less preferred for reasons on disposability or recyclability.

FIG. 24 shows the flysheet 8 of FIG. 23 when laid out. In the embodiment of FIGS. 22 and 24, the flysheet 8 has a construction in which no channel 48 or internal drawcord 14 is required. This may further simplify the flysheet 8, its manufacture, and its disposal/recycling.

Conventional sheet handling apparatus and methods may be used to form the arch with structural support chambers and/or mattress with inflatable chambers.

Figure 25:
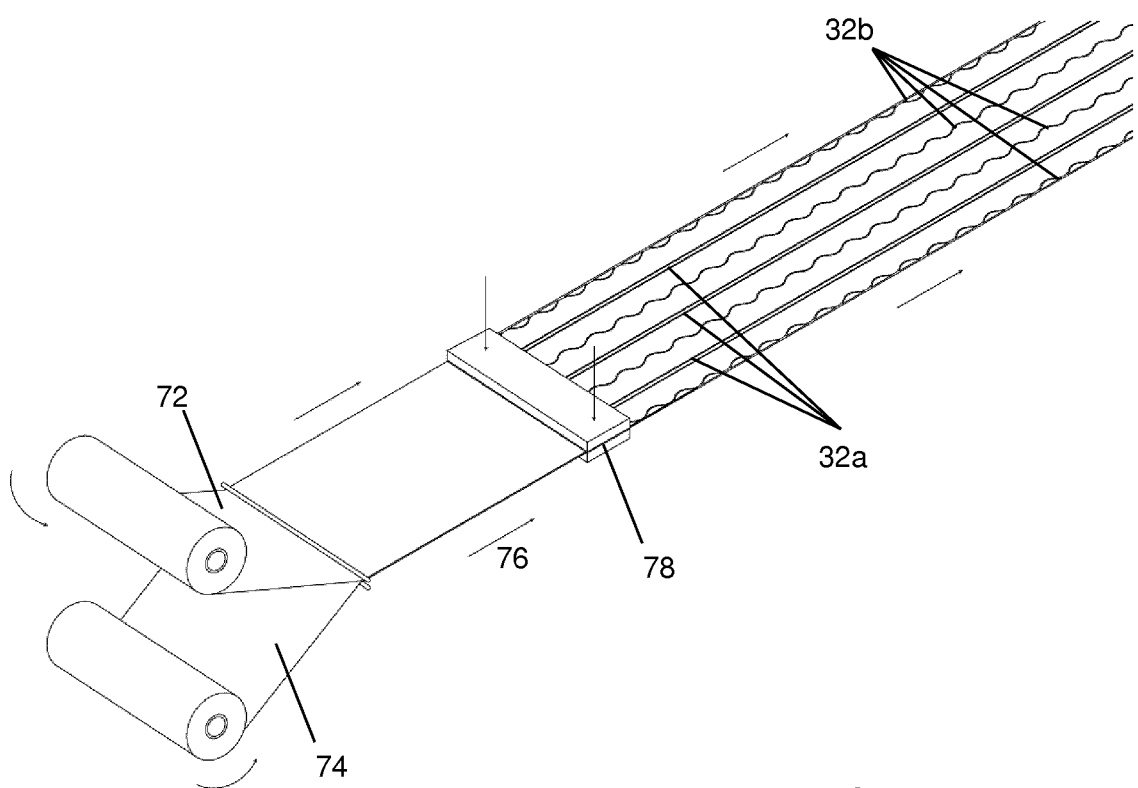
FIG. 25 shows a schematic view of a production step.

FIG. 25 shows a schematic view of an exemplary production step for an arch 4 in accordance with the embodiments of FIGS. 6-8 and 12-20.

In FIG. 25, flexible first and second sheets 72, 74, are unwound from first and second rolls of flexible sheet material. However, the flexible sheets may be supplied from any suitable source The first and second flexible sheets 72, 74 are conveyed along a path of travel, arrows 76, and brought into juxtaposition. A conveying mechanism may include various conventional sheet-guide and sheet-drive devices as desired, such as guide rollers and nip rollers.

A joining device 78, in the form of a direct contact heat sealer equipped with a given mold or die selectively joins the juxtaposed first and second sheets 72, 74 to one another along predetermined join lines 32a, 32b. The joining device 78 may produce seals of any type that bind two flexible sheets together, such as heat seals, adhesive seal, cohesive seal, etc., with heat seals being preferred. A heat seal, or heat weld, may be formed when the flexible sheets 72, 74, are brought into contact with one another and sufficient heat is applied to one or both sheets becomes molten and intermixes with the other heated sheet. Accordingly, the joining device 78 may be provided with a heated surface to give selective heating of the flexible sheets. Both heat and pressure are preferably applied.

An exemplary joining mechanism may comprise a pair of sealing members that converge within the travel path to form a sealing zone. For example, sealing members may comprise a pair of counter-rotating belts or wheels.

Multiple joining devices or joining heads may be provided across the width of the flexible sheets to simultaneously apply multiple join lines.

In the above manner the joins 32a, 32b can be formed between the juxtaposed sheets 72, 74 as they are conveyed along a longitudinal path of travel. The joining device may laterally shift a joining head, e.g. a heating and pressure element in relation to the path of travel to produce the non-linear, meandering or wave-form joins 32b.

In the illustrated embodiments the juxtaposed sheets 72, 74 are separate sheets, however, other embodiments may use opposing faces of a film folded upon itself along a side edge, or make use of juxtaposed sides of a flattened tube.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A tent comprising:
a flysheet; and
an inflated arch delimiting a volume, wherein said arch comprises a first flexible sheet and a second flexible sheet opposed to said first flexible sheet; wherein the first flexible sheet and the second flexible sheet are joined to each other to form a plurality of inflated structural support chambers;
wherein said plurality of inflated structural support chambers have a natural tendency to form a curve when inflated
wherein said plurality of inflated structural support chambers are elongate, extending in the curve of the arch,
wherein said plurality of inflated structural support chambers comprise opposed side-joins between the first and second sheets, wherein the lengths of the opposed side-joins are unequal, and
wherein a first side-join of at least one of the structural support chambers is substantially straight and a second side-join of the at least one structural support chamber opposed to the first side-join is non-straight.

2. The tent of claim 1 wherein the closed chambers are sealed once inflated, such that deflation is only possible by destructive measures.

3. The tent of claim 1 wherein the inflated structural support chambers have a lateral cross-section that is generally elliptical, oval or substantially circular.

4. The tent of claim 1, wherein the flysheet is pitched over the delimited volume, and is pivotally anchored to a tent supporting surface at a position on a first side of the arch, and to a tent supporting surface at a position on a second side the arch.

5. The tent of claim 4, wherein the anchoring positions are substantially laterally opposed to one another and form a virtual axis substantially lateral to the arch.

6. The tent of claim 4, wherein anchoring positions are within 15% of a midline of a length of the arch.

7. The tent of claim 1, further comprising an inflated mattress.

8. The tent of claim 7, wherein the mattress structurally supports the arch.

9. The tent of claim 1 comprising polyethylene, polypropylene, polyethylene terephthalate, polyethylene furanoate, polyester, nylon, or polyvinyl chloride, most preferably polyethylene.

10. The tent of claim 1 comprising at least 60 wt %, based on the total weight of the tent components, of thermoplastic polymer.

11. The tent of claim 1 comprising at least 60 wt %, based on the total weight of the tent components, of a single polymer type selected from the types polyethylene, polypropylene, polyethylene terephthalate, polyethylene furanoate, polyester, nylon, and polyvinyl chloride.

12. The tent of claim 1, wherein the tent is substantially free of one, more or all of: tent poles, thermoset plastics, zips, hook and loop fasteners, metals and metal alloys.

13. The tent of claim 1, wherein the second side-join of the structural support chamber opposed to the first side-join is meandering.

14. The tent of claim 1, wherein the second side-join of the structural support chamber opposed to the first side-join is a wave-form.

15. A kit of parts comprising a flysheet, an inflatable arch for delimiting a volume, wherein said arch comprises a first flexible sheet and a second flexible sheet opposed to said first flexible sheet
wherein the first flexible sheet and the second flexible sheet are joined to each other to form a plurality of inflated structural support chambers;
wherein said plurality of inflated structural support chambers have a natural tendency to form a curve when inflated
wherein said plurality of inflated structural support chambers are elongate, extending in the curve of the arch, and
wherein said plurality of inflated structural support chambers comprise opposed side-joins between the first and second sheets, wherein the lengths of the opposed side-joins are unequal, and wherein a first side-join of at least one of the structural support chambers is substantially straight and a second side-join of the at least one structural support chamber opposed to the first side-join is non-straight, and an inflatable mattress.

16. A method of making an inflatable arch having a curve, said method comprising the steps of:
- providing a first flexible sheet;
- providing a second flexible sheet opposed to said first flexible sheet; and
- joining the first flexible sheet and the second to each other to form a plurality of inflatable structural support chambers between the first flexible sheet and second flexible sheet, wherein said plurality of inflated structural support chambers are elongate, extending in the curve of the arch and comprise opposed side-joins between the first and second sheets, wherein the lengths of the opposed side joins are unequal so that said plurality of inflatable structural support chambers have a natural tendency to form the curve when inflated; and
- wherein a first side-join of at least one of the structural support chambers is substantially straight and a second side-join of the at least one structural support chamber opposed to the first side-join is non-straight.

* * * * *